United States Patent
Kang

(10) Patent No.: US 9,007,452 B2
(45) Date of Patent: Apr. 14, 2015

(54) MAGNIFICATION OBSERVATION DEVICE, MAGNIFICATION OBSERVATION METHOD, AND MAGNIFICATION OBSERVATION PROGRAM

(75) Inventor: Woobum Kang, Osaka (JP)

(73) Assignee: Keyence Corporation, Osaka (JP)

( * ) Notice: Subject to any disclaimer, the term of this patent is extended or adjusted under 35 U.S.C. 154(b) by 432 days.

(21) Appl. No.: 13/558,430

(22) Filed: Jul. 26, 2012

(65) Prior Publication Data

US 2013/0050464 A1 Feb. 28, 2013

(30) Foreign Application Priority Data

Aug. 31, 2011 (JP) ................................. 2011-188704

(51) Int. Cl.
- *H04N 5/225* (2006.01)
- *G02B 21/26* (2006.01)
- *G02B 21/36* (2006.01)
- *G02B 21/02* (2006.01)

(52) U.S. Cl.
CPC .............. *G02B 21/26* (2013.01); *G02B 21/025* (2013.01); *G02B 21/362* (2013.01); *G02B 21/367* (2013.01)

(58) Field of Classification Search
USPC ........... 348/79, 80, 229.1, 222; 359/387, 381, 359/368, 363
See application file for complete search history.

(56) References Cited

U.S. PATENT DOCUMENTS

| | | | |
|---|---|---|---|
| 5,715,081 A * | 2/1998 | Chastang et al. | 359/385 |
| 6,661,571 B1 * | 12/2003 | Shioda et al. | 359/372 |
| 6,714,205 B1 * | 3/2004 | Miyashita et al. | 345/536 |
| 7,324,274 B2 * | 1/2008 | Komatsu et al. | 359/391 |
| 2008/0297596 A1 | 12/2008 | Inomata et al. | |
| 2008/0297597 A1 * | 12/2008 | Inomata et al. | 348/80 |
| 2009/0159814 A1 * | 6/2009 | Maiya | 250/458.1 |
| 2009/0189994 A1 * | 7/2009 | Shimonaka | 348/222.1 |
| 2009/0237502 A1 * | 9/2009 | Maiya | 348/79 |
| 2010/0149362 A1 | 6/2010 | Kang | |
| 2010/0149363 A1 | 6/2010 | Inomata et al. | |
| 2010/0149364 A1 | 6/2010 | Kang | |
| 2011/0134517 A1 * | 6/2011 | Shirota et al. | 359/381 |
| 2012/0001069 A1 | 1/2012 | Kashihara | |
| 2012/0001070 A1 | 1/2012 | Takagi | |

FOREIGN PATENT DOCUMENTS

| | | |
|---|---|---|
| JP | 9-281405 | 10/1997 |
| JP | 2009-175334 | 8/2009 |
| JP | 2010-130408 | 6/2010 |
| JP | 2010-139890 | 6/2010 |
| JP | 2010-141697 | 6/2010 |

(Continued)

*Primary Examiner* — Paulos M Natnael
(74) *Attorney, Agent, or Firm* — Kilyk & Bowersox, P.L.L.C.

(57) ABSTRACT

Provided are a magnification observation device, a magnification observation method, and a magnification observation program in which connected image data can be efficiently obtained in a short period of time when re-imaging an object to obtain the connected image data corresponding to a plurality of unit regions. A plurality of unit regions on a surface of an observation object are imaged, and a plurality of pieces of image data respectively corresponding to the plurality of unit regions are generated. An image of the object including the plurality of unit regions is displayed as a region presentation image. When any of the plurality of unit regions is selected by a selection instruction from a user, the selected unit region is re-imaged, to generate image data corresponding to the selected unit region as re-imaged data.

10 Claims, 16 Drawing Sheets

(56) References Cited

FOREIGN PATENT DOCUMENTS

| JP | 2010-141698 | 6/2010 |
| JP | 2010-141699 | 6/2010 |
| JP | 2010-141700 | 6/2010 |
| JP | 2011-118107 | 6/2011 |

* cited by examiner

MAGNIFICATION OBSERVATION DEVICE, MAGNIFICATION OBSERVATION METHOD, AND MAGNIFICATION OBSERVATION PROGRAM

CROSS-REFERENCE TO RELATED APPLICATIONS

The present application claims foreign priority based on Japanese Patent Application No. 2011-188704, filed Aug. 31, 2011, the contents of which is incorporated herein by reference.

BACKGROUND OF THE INVENTION

1. Field of the Invention

The present invention relates to a magnification observation device, a magnification observation method, and a magnification observation program.

2. Description of Related Art

Japanese Unexamined Patent Publication No. 2008-139795 discloses a fluorescence microscope system in which images of a plurality of regions of an object are joined together to generate one synthetic wide-region image. According to this fluorescence microscope system, it is possible to obtain an image of a wider region of an object than a region corresponding to a visual field of an object lens with the lowest magnification.

In the above fluorescence microscope system, for example, a sample placement part placed with an object can be moved, and a plurality of regions of the object can be imaged, to thereby obtain a plurality of images. Thereafter, the obtained plurality of images are joined together. This leads to generation of a synthetic wide-region image, and the generated synthetic wide-region image is displayed in a display part.

When part of the plurality of images is not appropriately obtained at the time of generating the synthetic wide-region image, a user can view the generated synthetic wide-region image, to thereby recognize that part of the regions has not been appropriately imaged. In this case, the user performs re-imaging on all the regions to regenerate a synthetic wide-region image.

However, with increase in the number of regions to be imaged, the time required for re-imaging the plurality of regions and the time required for generating a synthetic wide-region image become longer.

SUMMARY OF THE INVENTION

It is an object of the present invention to provide a magnification observation device, a magnification observation method, and a magnification observation program in which, in the case of re-imaging an object to obtain connected image data corresponding to a plurality of unit regions, the connected image data can be efficiently obtained in a short period of time.

(1) According to one embodiment of the invention, there is provided a magnification observation device which images an object to display an image of the object, the device including: an imaging part that respectively images a plurality of unit regions of an object on a previously set imaging condition, to generate a plurality of pieces of image data respectively corresponding to the plurality of unit regions; a positional information generating part that generates positional information indicative of respective positions of the plurality of unit regions; a storage part that stores the plurality of pieces of image data generated by the imaging part along with the positional information generated by the positional information generating part; a connecting part that connects the plurality of pieces of image data stored into the storage part, to generate connected image data; a display part that displays images of the object including the plurality of unit regions as a region presentation image; an accepting part that accepts from a user a selection instruction for selecting any of the plurality of unit regions with the region presentation image being displayed by the display part; and a control part that controls the imaging part so as to generate image data corresponding to the selected unit region by re-imaging the selected unit region on an imaging condition different from the previously set imaging condition based on the selection instruction accepted by the accepting part and the positional information stored into the storage part, and stores the image data generated by the re-imaging into the storage part replaceably with the image data corresponding to the selected unit region among the image data corresponding to the plurality of unit regions stored into the storage part.

In the magnification observation device, a plurality of unit regions of an object are respectively imaged on a previously set imaging condition, to generate a plurality of pieces of image data respectively corresponding to the plurality of unit regions. Further, there is generated positional information indicative of respective positions of the plurality of unit regions. The generated plurality of pieces of image data are stored along with the positional information, and the stored plurality of pieces of image data are connected, to generate connected image data.

An image of the object including the plurality of unit regions is displayed as a region presentation image. In this state, when any of the plurality of unit regions is selected by a selection instruction from the user, the selected unit region is re-imaged based on positional information on an imaging condition different from the previously set imaging condition, to generate image data corresponding to the selected unit region. The image data generated by the re-imaging is stored replaceably with the image data corresponding to the selected unit region among the image data corresponding to the stored plurality of unit regions. Hence, the image data corresponding to the selected unit region can be replaced with the stored image data, to thereby generate the connected image data corresponding to the plurality of unit regions. This can eliminate the need for re-imaging all the unit regions even when an image of part of the plurality of unit regions is not appropriately obtained. Consequently, in the case of re-imaging the object to obtain connected image data corresponding to the plurality of unit regions, the connected image data can be efficiently obtained in a short period of time.

Further, since the re-imaging is performed on the imaging condition for each unit region which is different from the previously set imaging condition, the image data corresponding to the selected unit region is replaceable with the image data generated by re-imaging on the imaging condition different from the previously set imaging condition. Therefore, when an imaging condition for part of the unit regions is not appropriate, an image of that unit region can be obtained on an appropriate imaging condition.

(2) When the selection instruction is accepted by the accepting part, the control part may replace the image data corresponding to the selected unit region among the image data corresponding to the plurality of unit regions stored in the storage part with the image data generated by the re-imaging.

In this case, the image data corresponding to the selected unit region among the stored image data corresponding to the plurality of unit regions is replaced with the image data generated by the re-imaging. This eliminates the need for the user to perform an operation for replacing the image data. Consequently, in the case of re-imaging the object, the connected image data including the image data generated by the re-imaging can be obtained with ease.

(3) The accepting part may further accept from the user an adjustment instruction for adjusting the imaging condition of the imaging part to an imaging condition different from the previously set imaging condition, and when the selection instruction is accepted by the accepting part, the control part may control the imaging part so as to perform the re-imaging on the imaging condition adjusted in accordance with the adjustment instruction, thereby generating image data.

In this case, by the adjustment instruction from the user, re-imaging can be performed while the imaging condition for each unit region is adjusted to an imaging condition different from the previously set imaging condition. This allows replacement of the image data corresponding to the selected unit region with the image data generated by the re-imaging on the adjusted imaging condition. Therefore, when an imaging condition for part of the unit regions is not appropriate, an image of that unit region can be obtained on an appropriate imaging condition.

(4) Every time image data corresponding to one unit region is generated, the connecting part may sequentially connect the generated image data to previously generated image data corresponding to another unit region, and the display part may sequentially display images of a plurality of unit regions as the region presentation image based on the image data sequentially connected by the connecting part.

In this case, every time image data is generated, the images of the plurality of unit regions are sequentially displayed as the region presentation image in the display part. The user can view the region presentation image displayed in the display part, to thereby select with ease a unit region that needs re-imaging. Further, the user can recognize with ease which region among the plurality of unit regions is a currently imaged unit region.

(5) When the selection instruction is accepted by the accepting part, the control part may control the connecting part so as to suspend connection of image data.

In this case, the selection instruction is accepted during the time until all the unit regions are imaged, to suspend the connection of the image data. This prevents connection of a plurality of pieces of image data including inappropriate image data from being continued. Hence, the wasteful time in generation of the connected image data is deleted. Consequently, appropriate connected image data can be efficiently generated.

(6) The imaging part can image the object at a first magnification and a second magnification lower than the first magnification, and may respectively image the plurality of unit regions at the first magnification to generate a plurality of pieces of image data corresponding to the plurality of unit regions, and the display part may display, as the region presentation image, images based on image data generated by imaging at the second magnification by the imaging part.

In this case, it is possible to display the region presentation image by means of a small capacity of image data. This eliminates the need for spending a long period of time on generation of image data for displaying the region presentation image. Further, it is possible to prevent an amount of image data for displaying the region presentation image from exceeding a usable capacity of an operation memory.

(7) The control part may automatically set the previously set imaging condition for imaging each unit region based on image data generated by imaging each unit region before imaging on the previously set imaging condition, and determine whether or not the imaging condition for each unit region has been normally set, and the control part may control the display part so as to display in the region presentation image an indicator for identifying an image of a unit region determined not to have been normally set with the imaging condition.

In this case, since the imaging condition for each unit region is automatically set, each unit region is imaged on an appropriate imaging condition without the user performing an operation for adjusting the imaging condition. Further, the user can view the indicator displayed on the region presentation image, to thereby recognize with ease the image of the unit region having not been normally set with the imaging condition. Therefore, the unit region can be selected based on the indicator, to thereby re-image with ease the unit region determined not to have been normally set with the imaging condition.

(8) The magnification observation device may further include a determination part which determines whether or not the image of each unit region satisfies the previously set condition based on the image data corresponding to each unit region, and the control part may control the display part so as to display in the region presentation image an indicator for identifying an image of a unit region having been determined by the determination part not to satisfy the previously set condition.

In this case, the user can view the indicator displayed on the region presentation image, to thereby recognize with ease the image of the unit region in which an image satisfying the previously set condition has not been obtained. Therefore, the unit region can be selected based on the indicator, to thereby re-image with ease the unit region in which an image satisfying the previously set condition has not been obtained.

(9) The imaging part may sequentially image the plurality of unit regions to sequentially generate image data corresponding to each unit region, and the control part may control the imaging part so as to sequentially re-image the unit region selected based on the selection instruction accepted by the accepting part and subsequent unit regions, thus generating image data corresponding to the selected unit region and the subsequent unit regions.

In this case, the selected unit region and the subsequent unit regions are sequentially re-imaged. Therefore, when images are obtained which are not appropriate with respect to the plurality of unit regions, the selected unit region and the plurality of subsequent unit regions are re-imaged by the user issuing a one-time selection direction. This simplifies the operation for the selection instruction for the unit region, performed by the user.

(10) According to another embodiment of the invention, there is provided a magnification observation method for imaging an object to display an image of the object, the method including the steps of: respectively imaging a plurality of unit regions of an object on a previously set imaging condition, to generate a plurality of pieces of image data respectively corresponding to the plurality of unit regions; generating positional information indicative of respective positions of the plurality of unit regions; storing the generated plurality of pieces of image data along with the generated positional information; connecting the stored plurality of pieces of image data, to generate connected image data; displaying images of the object including the plurality of unit regions as a region presentation image; accepting a selection instruction for selecting any of the plurality of unit regions with the region presentation image in a displayed state; and generating image data corresponding to the selected unit region by re-imaging the selected unit region on an imaging condition different from the previously set imaging condition based on the accepted selection instruction and the stored positional information, and storing the generated image data replaceably with the image data corresponding to the selected unit region among the image data corresponding to the plurality of stored unit regions.

In the magnification observation method, a plurality of unit regions of an object are respectively imaged on a previously set imaging condition, to generate a plurality of pieces of image data respectively corresponding to the plurality of unit regions. Further, there is generated positional information indicative of respective positions of the plurality of unit regions. The generated plurality of pieces of image data are stored along with the generated positional information, and the stored plurality of pieces of image data are connected, to generate connected image data.

An image of the object including the plurality of unit regions is displayed as a region presentation image. In this state, when any of the plurality of unit regions is selected by a selection instruction from the user, the selected unit region is re-imaged based on positional information on an imaging condition different from the previously set imaging condition, to generate image data corresponding to the selected unit region. The image data generated by the re-imaging is stored replaceably with the image data corresponding to the selected unit region among the image data corresponding to the stored plurality of unit regions. Hence, the image data corresponding to the selected unit region can be replaced with the stored image data, to thereby generate the connected image data corresponding to the plurality of unit regions. This can eliminate the need for re-imaging all the unit regions even when an image of part of the plurality of unit regions is not appropriately obtained. Consequently, in the case of re-imaging the object to obtain connected image data corresponding to the plurality of unit regions, the connected image data can be efficiently obtained in a short period of time.

Further, since re-imaging is performed on the imaging condition for each unit region which is different from the previously set imaging condition, the image data corresponding to the selected unit region is replaceable with the image data generated by the re-imaging on the imaging condition different from the previously set imaging condition. Therefore, when an imaging condition for part of the unit regions is not appropriate, images of those unit regions can be obtained on appropriate imaging conditions.

(11) According to still another embodiment of the invention, there is provided a magnification observation program for causing a processing apparatus to execute a process of imaging an object to display an image of the object, the program including the processes of respectively imaging a plurality of unit regions of an object on a previously set imaging condition, to generate a plurality of pieces of image data respectively corresponding to the plurality of unit regions; generating positional information indicative of respective positions of the plurality of unit regions; storing the generated plurality of pieces of image data along with the generated positional information; connecting the stored plurality of pieces of image data, to generate connected image data; displaying images of the object including the plurality of unit regions as a region presentation image; accepting a selection instruction for selecting any of the plurality of unit regions with the region presentation image in a displayed state; and generating image data corresponding to the selected unit region by re-imaging the selected unit region on an imaging condition different from the previously set imaging condition based on the accepted selection instruction and the stored positional information, and storing the image data generated by the re-imaging replaceably with the image data corresponding to the selected unit region among the image data corresponding to the plurality of stored unit regions.

In the magnification observation program, a plurality of unit regions of an object are respectively imaged on a previously set imaging condition, to generate a plurality of pieces of image data respectively corresponding to the plurality of unit regions. Positional information indicative of respective positions of the plurality of unit regions is also generated. The generated plurality of pieces of image data are stored along with the generated positional information, and the stored plurality of pieces of image data are connected, to generate connected image data.

An image of the object including the plurality of unit regions is displayed as a region presentation image. In this state, when any of the plurality of unit regions is selected by a selection instruction from the user, the selected unit region is re-imaged based on positional information on an imaging condition different from the previously set imaging condition, to generate image data corresponding to the selected unit region. The image data generated by the re-imaging is stored replaceably with the image data corresponding to the selected unit region among the image data corresponding to the stored plurality of unit regions. Hence, the image data corresponding to the selected unit region can be replaced with the stored image data, to thereby generate the connected image data corresponding to the plurality of unit regions. This can eliminate the need for re-imaging all the unit regions even when part of the plurality of unit regions is not appropriately obtained. Consequently, in the case of re-imaging the object to obtain connected image data corresponding to the plurality of unit regions, the connected image data can be efficiently obtained in a short period of time.

Further, since re-imaging is performed on the imaging condition for each unit region which is different from the previously set imaging condition, the image data corresponding to the selected unit region is replaceable with the image data generated by re-imaging on the imaging condition different from the previously set imaging condition. Therefore, when an imaging condition for part of the unit regions is not appropriate, an image of that unit region can be obtained on an appropriate imaging condition.

According to the present invention, in the case of re-imaging an object to obtain connected image data corresponding to a plurality of unit regions, the connected image data can be efficiently obtained in a short period of time.

DETAILED DESCRIPTION OF PREFERRED EMBODIMENTS

[1] First Embodiment

A magnification observation device, a magnification observation method, and a magnification observation program according to a first embodiment will be described with reference to the drawings.

(1) Configuration of Magnification Observation Device

Figure 1:
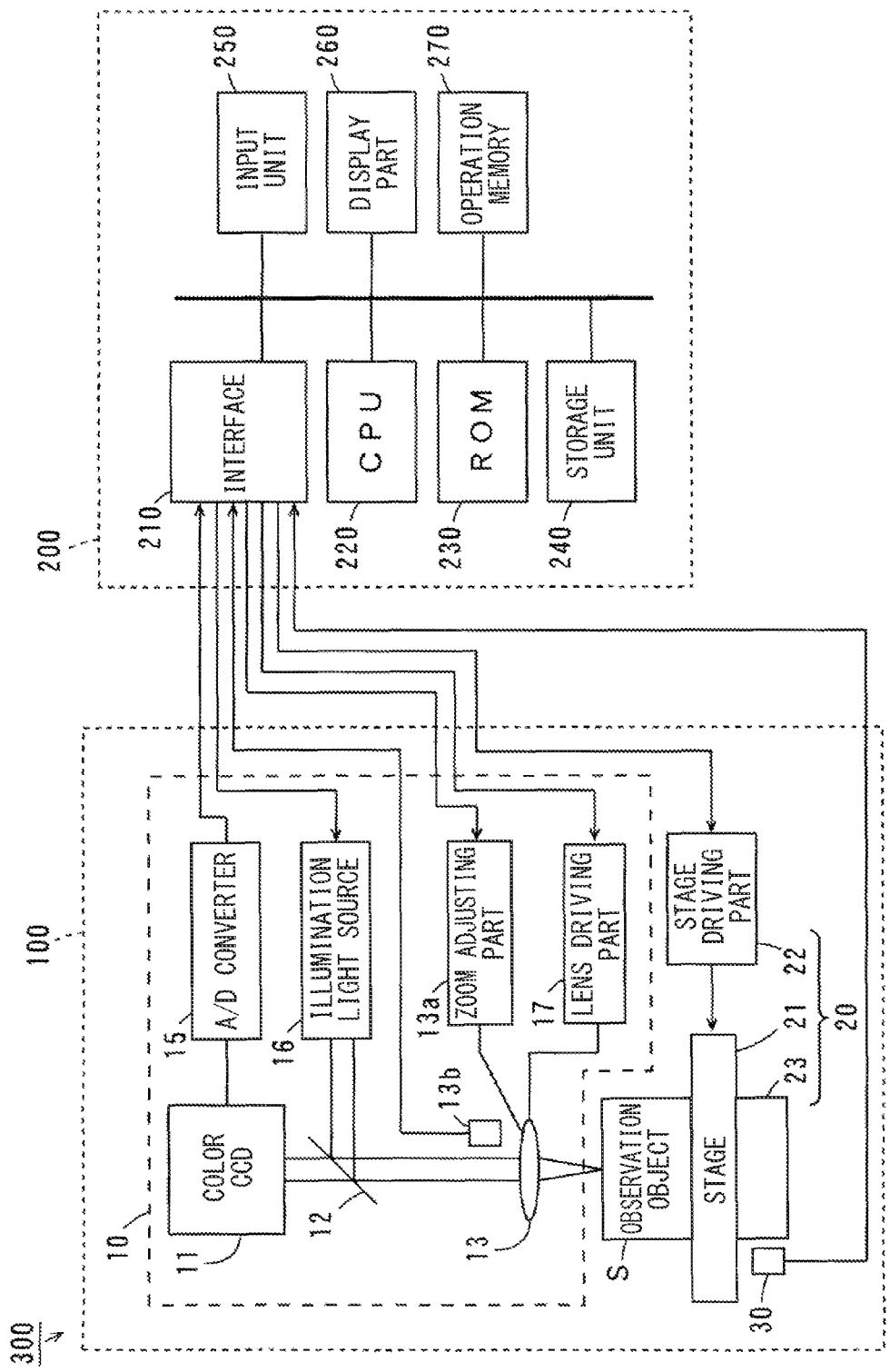
FIG. 1 is a block diagram showing a configuration of a magnification observation device according to a first embodiment.

FIG. 1 is a block diagram showing a configuration of a magnification observation device according to the first embodiment.

Hereinafter, two directions orthogonal within a horizontal plane are taken as an X-direction and a Y-direction, and a vertical direction (perpendicular direction) to the X-direction and the Y-direction is taken as a Z-direction.

As shown in FIG. 1, a magnification observation device 300 is provided with a microscope 100 and an image processing apparatus 200.

The microscope 100 includes an imaging unit 10, a stage unit 20, and a rotational angle sensor 30. The imaging unit 10 includes a color CCD (charge coupled device) 11, a half mirror 12, an object lens 13, a zoom adjusting part 13a, a magnification detecting part 13b, an A/D converter (analog/digital converter) 15, an illumination light source 16, and a lens driving part 17. The stage unit 20 includes a stage 21, a stage driving part 22, and a stage supporting part 23. An observation object S is placed on the stage 21.

The illumination light source 16 is, for example, a halogen lamp or a white light LED (light-emitting diode) which generates white light. White light generated by the illumination light source 16 is reflected by the half mirror 12, and thereafter collected by the object lens 13 onto the observation object S on the stage 21.

The white light reflected by the observation object S is transmitted through the object lens 13 and the half mirror 12, and incident on the color CCD 11. The color CCD 11 has a plurality of pixels for red that receive red wavelength light, a plurality of pixels for green that receive green wavelength light, and a plurality of pixels for blue that receive blue wavelength light. The plurality of pixels for red, the plurality of pixels for green, and the plurality of pixels for blue are two-dimensionally arrayed. From each of the pixels in the color CCD 11, an electric signal corresponding to a light receiving amount is outputted. The output signal of the color CCD 11 is converted to a digital signal by the A/D converter 15. The digital signal outputted from the A/D converter 15 is sequentially provided as image data to the image processing apparatus 200. Instead of the color CCD 11, an imaging element such as a CMOS (complementary metal oxide semiconductor) image sensor may be used.

In the present embodiment, the object lens 13 is a zoom lens. The zoom adjusting part 13a changes a magnification of the object lens 13 by control of the image processing apparatus 200. The magnification detecting part 13b detects the magnification of the object lens 13, and provides a detection result to the image processing apparatus 200. Thereby, the magnification of the object lens 13 is adjustable by the image processing apparatus 200 to an arbitrary magnification within a fixed range. It is to be noted that the zoom adjusting part 13a may be operated by the user, to adjust the magnification of the object lens 13. In this case, the adjusted magnification of the object lens 13 is detected by the magnification detecting part 13b, and provided to the image processing apparatus 200.

Further, the object lens 13 is provided movably in the Z-direction. The lens driving part 17 moves the object lens 13 in the Z-direction by control of the image processing apparatus 200. Thereby, a focal position of the imaging unit 10 moves in the Z-direction.

The stage 21 is rotatably provided on the stage supporting part 23 around an axis in the Z-direction. The stage driving part 22 moves the stage 21 in an x-direction and a y-direction, described later, relatively with respect to the stage supporting part 23 based on a movement command signal (drive pulse) provided from the image processing apparatus 200. The stage driving part 22 uses a stepping motor. The rotational angle sensor 30 detects a rotational angle of the stage 21, and provides the image processing apparatus 200 with an angle detection signal indicating the detected angle. In the image processing apparatus 200, based on the response signal from the stage driving part 22 with respect to the movement command signal and the angle detection signal from the rotational angle sensor 30, a position of the stage 21 in the X-direction and the Y-direction and a rotational angle thereof are acquired.

The image processing apparatus 200 includes an interface 210, a CPU (central processing unit) 220, a ROM (read only memory) 230, a storage unit 240, an input unit 250, a display part 260, and an operation memory 270.

A system program is stored into the ROM 230. The storage unit 240 is made up of a hard disk and the like. In the storage unit 240, a later-described magnification observation program is stored, and a variety of data such as image data provided from the microscope 100 through the interface 210 are also stored. A detail of the magnification observation program will be described later. The input unit 250 includes a keyboard and a pointing device. As the pointing device, a mouse, a joystick, or the like is used.

The display part 260 is configured, for example, by a liquid crystal display panel or an organic EL (electroluminescent) panel.

The operation memory 270 is made up of a RAM (random access memory), and used for processing a variety of data.

The CPU 220 executes the magnification observation program stored in the storage unit 240, to perform image processing based on image data by means of the operation memory 270, and displays an image based on the image data in the display part 260. Further, the CPU 220 controls the color CCD 11, the zoom adjusting part 13a, the illumination light source 16, the lens driving part 17, and the stage driving part 22 of the microscope 100 through the interface 210.

Figure 2:
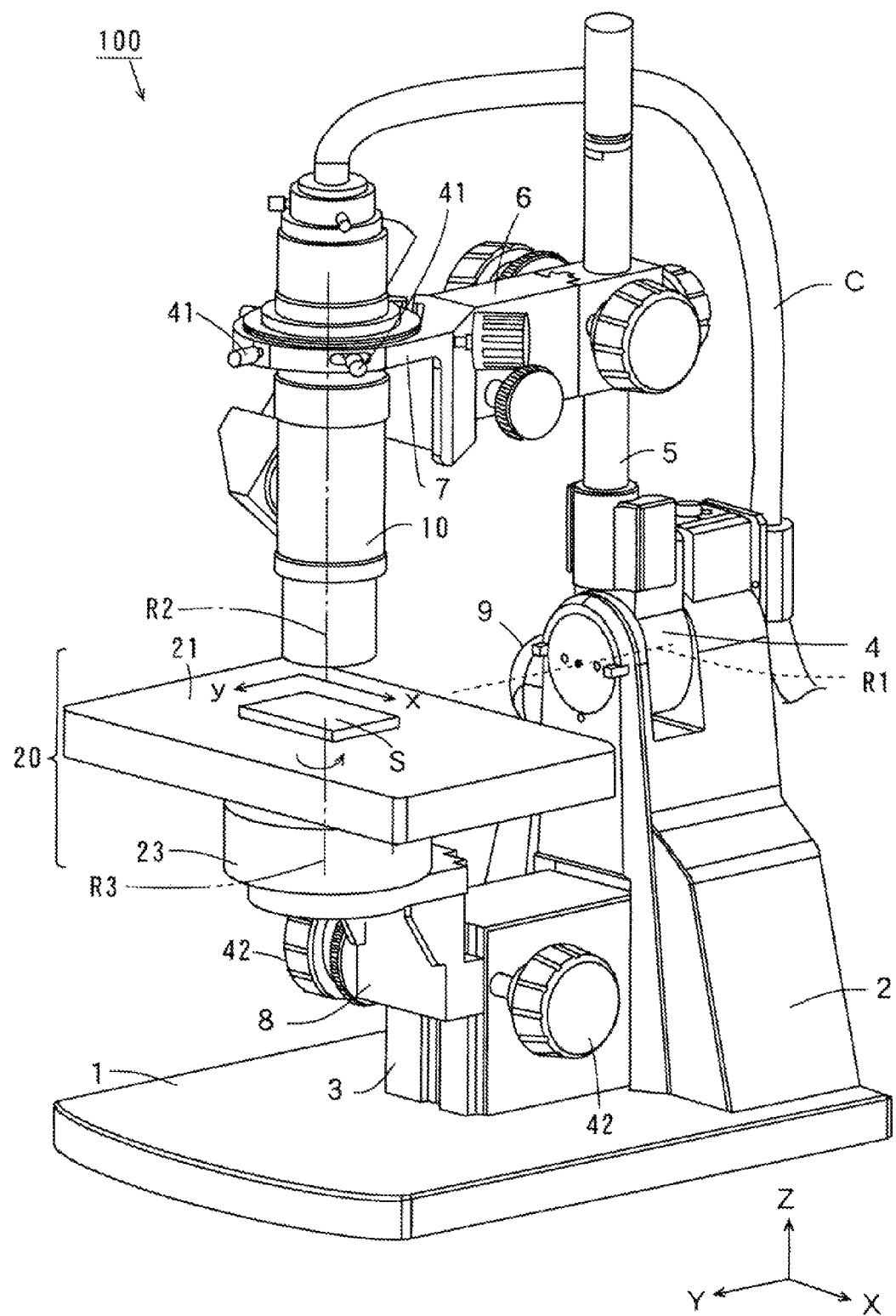
FIG. 2 is a perspective view showing a microscope of the magnification observation device according to the first embodiment.

FIG. 2 is a perspective view showing the microscope 100 of the magnification observation device 300 according to the first embodiment. In FIG. 2, the X-direction, the Y-direction, and the Z-direction are indicated by arrows.

As shown in FIG. 2, the microscope 100 has a base 1. A first supporting base 2 is attached onto the base 1, and a second supporting base 3 is also attached to the front surface of the first supporting base 2 so as to be embedded thereinto.

A connecting part 4 is rotatably attached to the top edge of the first supporting base 2 around a rotational axis R1 extending in the Y-direction. A rotational column 5 is attached to the connecting part 4. Thereby, the rotational column 5 is inclinable within a vertical plane parallel to the Z-direction with the rotational axis R1 taken as a fulcrum point in association with rotation of the connecting part 4. The user can fix the connecting part 4 to the first supporting base 2 by means of a fixing knob 9.

A circular supporting part 7 is attached to the front surface of a connecting part 6. A substantially tubular imaging unit 10 is attached to the supporting part 7. In the state of FIG. 2, a light axis R2 of the imaging unit 10 is parallel to the Z-direction. The supporting part 7 has a plurality of adjustment screws 41 for moving the imaging unit 10 within a horizontal plane. It is possible to adjust a position of the imaging unit 10 such that the light axis R2 of the imaging unit 10 vertically intersects with a rotational axis R1 by means of the plurality of adjustment screws 41.

A slider 8 is attached, slidably in the Z-direction, to the front surface of the second supporting base 3 on the base 1. An adjustment knob 42 is provided on the side surface of the second supporting base 3. A position of the slider 8 in the Z-direction (height direction) is adjustable by an adjustment knob 42.

The stage supporting part 23 of the stage unit 20 is attached onto the slider 8. The stage 21 is rotationally provided around a rotational axis R3 in the Z-direction with respect to the stage supporting part 23. Further, the x-direction and the y-direction intersecting with each other within the horizontal plane are set on the stage 21. The stage 21 is provided movably in the x-direction and the y-direction by the stage driving part 22 of FIG. 1. When the stage 21 rotates around the rotational axis R3, the x-direction and the y-direction of the stage 21 also rotate. This leads to inclination of the x-direction and the y-direction of the stage 21 within a horizontal plane with respect to the X-direction and the Y-direction.

An imaging range (visual field range) of the imaging unit 10 varies depending on a magnification of the imaging unit 10. Hereinafter, the imaging range of the imaging unit 10 is referred to as a unit region. The stage 21 can be moved in the x-direction and the y-direction, to thereby acquire image data of a plurality of unit regions. The image data of the plurality of unit regions can be connected, to thereby display images of the plurality of unit regions in the display part 260 of FIG. 1.

Although the imaging range of the imaging unit 10 is referred to as the unit region in the present embodiment as thus described, the unit region is not necessarily the imaging range of the imaging unit 10. For example, part of regions within the imaging range of the imaging unit 10 may be taken as a unit region. In this case, the unit region is smaller than the imaging range of the imaging unit 10.

Figure 3:
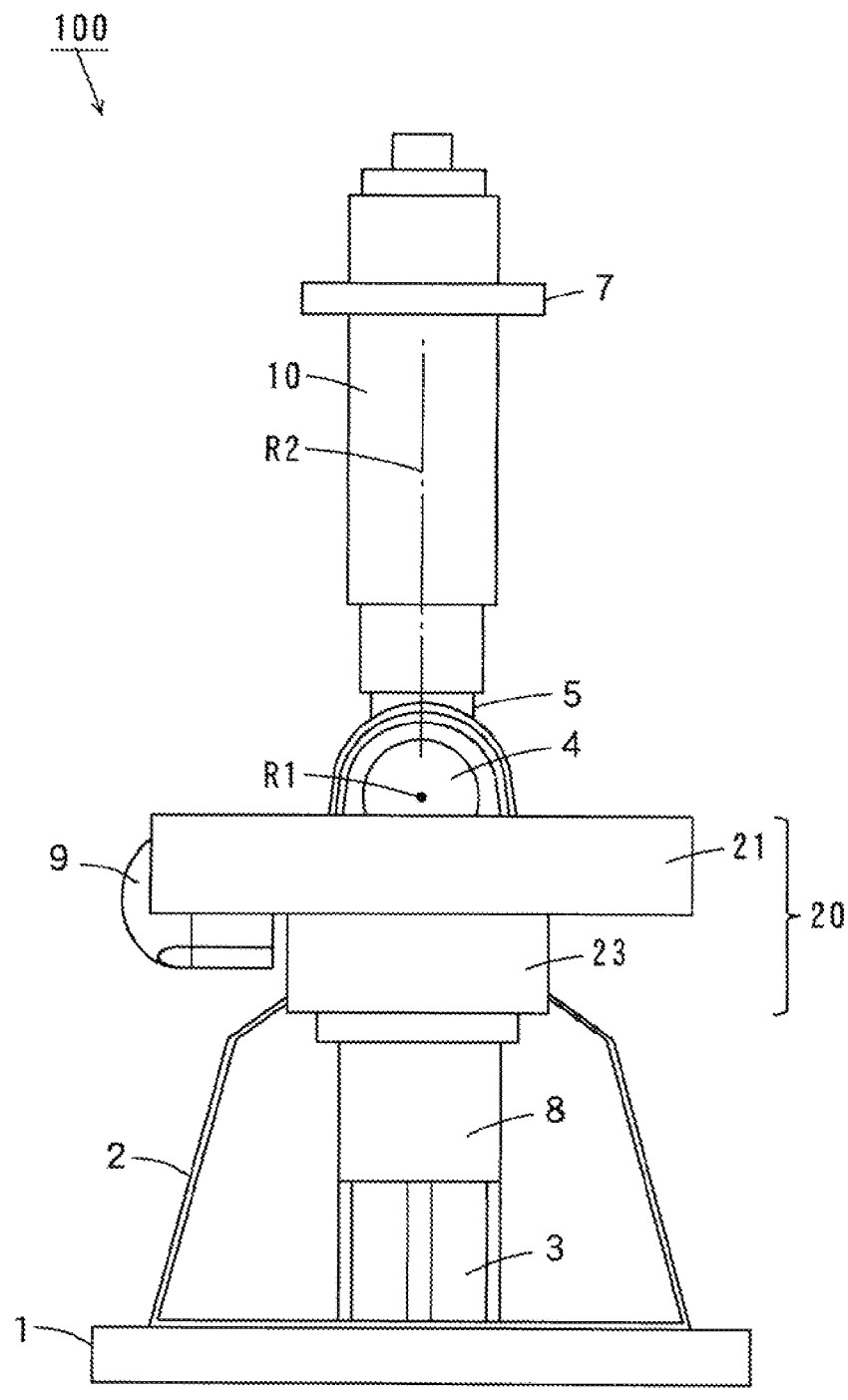
FIG. 3 is a schematic view showing a state where an imaging unit of the microscope is fixed parallel to a Z-direction.
Figure 4:
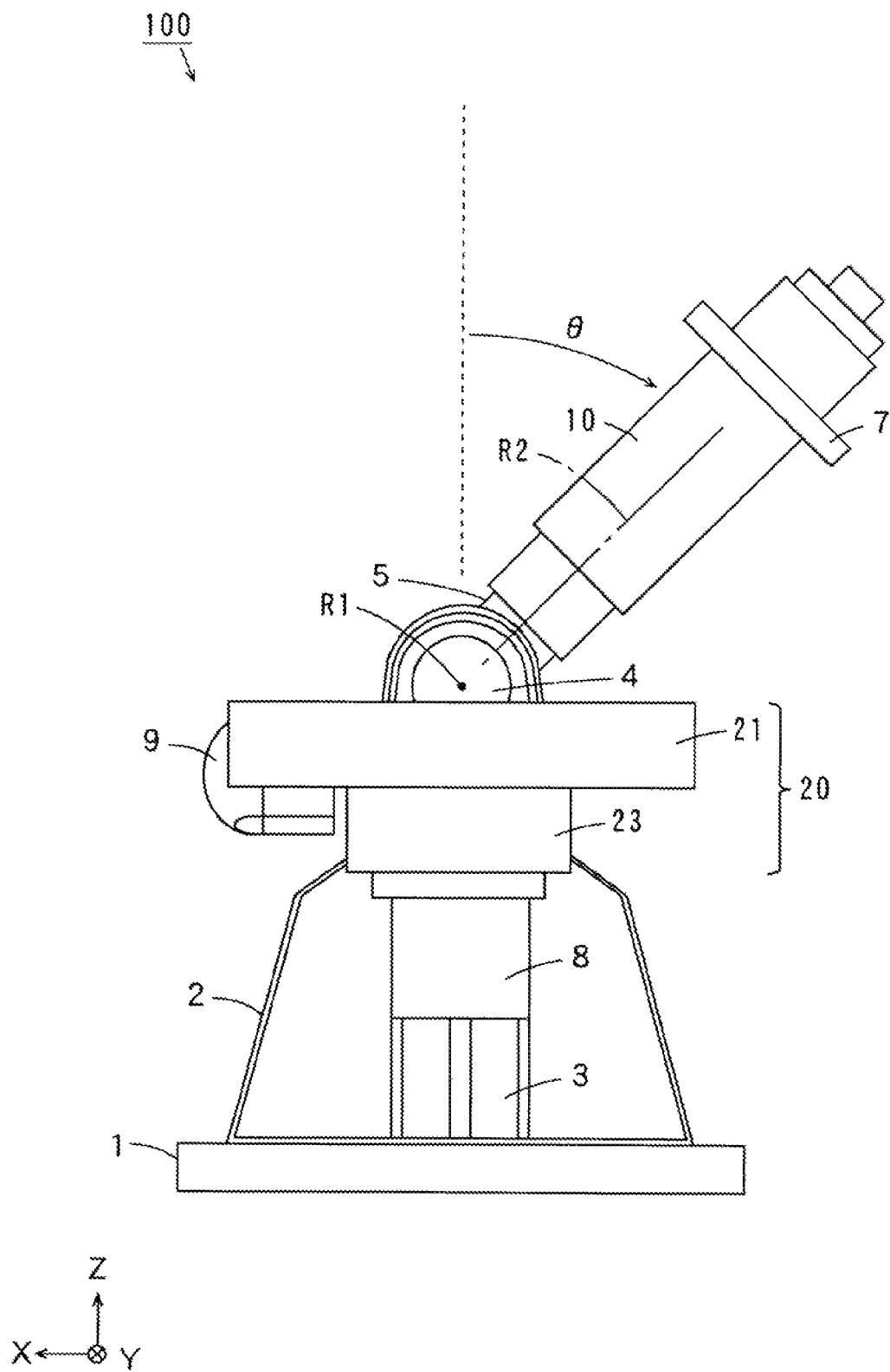
FIG. 4 is a schematic view showing a state where the imaging unit of the microscope is inclined at a desired angle from the Z-direction.

FIG. 3 is a schematic view showing a state where the imaging unit 10 of the microscope 100 is fixed parallel to the Z-direction. Further, FIG. 4 is a schematic view showing a state where the imaging unit 10 of the microscope 100 is inclined at a desired angle from the Z-direction.

As shown in FIG. 3, with the rotational column 5 in a parallel state to the Z-direction, the fixing knob 9 is fastened, to fix the connecting part 4 to the second supporting base 3. Thereby, the light axis R2 of the imaging unit 10 vertically intersects with the rotational axis R1 while being in a parallel state to the Z-direction. In this case, the light axis R2 of the imaging unit 10 is vertical to the surface of the stage 21.

The fixing knob 9 is loosened to make the connecting part 4 rotatable around the rotational axis R1, and the rotational column 5 inclinable with the rotational axis R1 taken as a fulcrum point. Therefore, as shown in FIG. 4, the light axis R2 of the imaging unit 10 is inclinable at an arbitrary angle θ with respect to the Z-direction. In this case, the light axis R2 of the imaging unit 10 vertically intersects with the rotational axis R1. Similarly, the light axis R2 of the imaging unit 10 is inclinable at an arbitrary angle on the side opposite to the side in FIG. 4 with respect to the Z-direction.

Therefore, a height of the surface of an observation object on the stage 21 can be made to agree with a height of the rotational axis R1, to thereby observe the same portion of the observation object in a vertical direction and an oblique direction.

(2) Display Examples of Image of Observation Object at the Time of Imaging

In the following description, two magnifications, which are different from each other within a certain range, of the object lens 13 adjustable by the zoom adjusting part 13a of FIG. 1 are referred to as a first magnification and a second magnification. The second magnification is lower than the first magnification.

Figure 5:
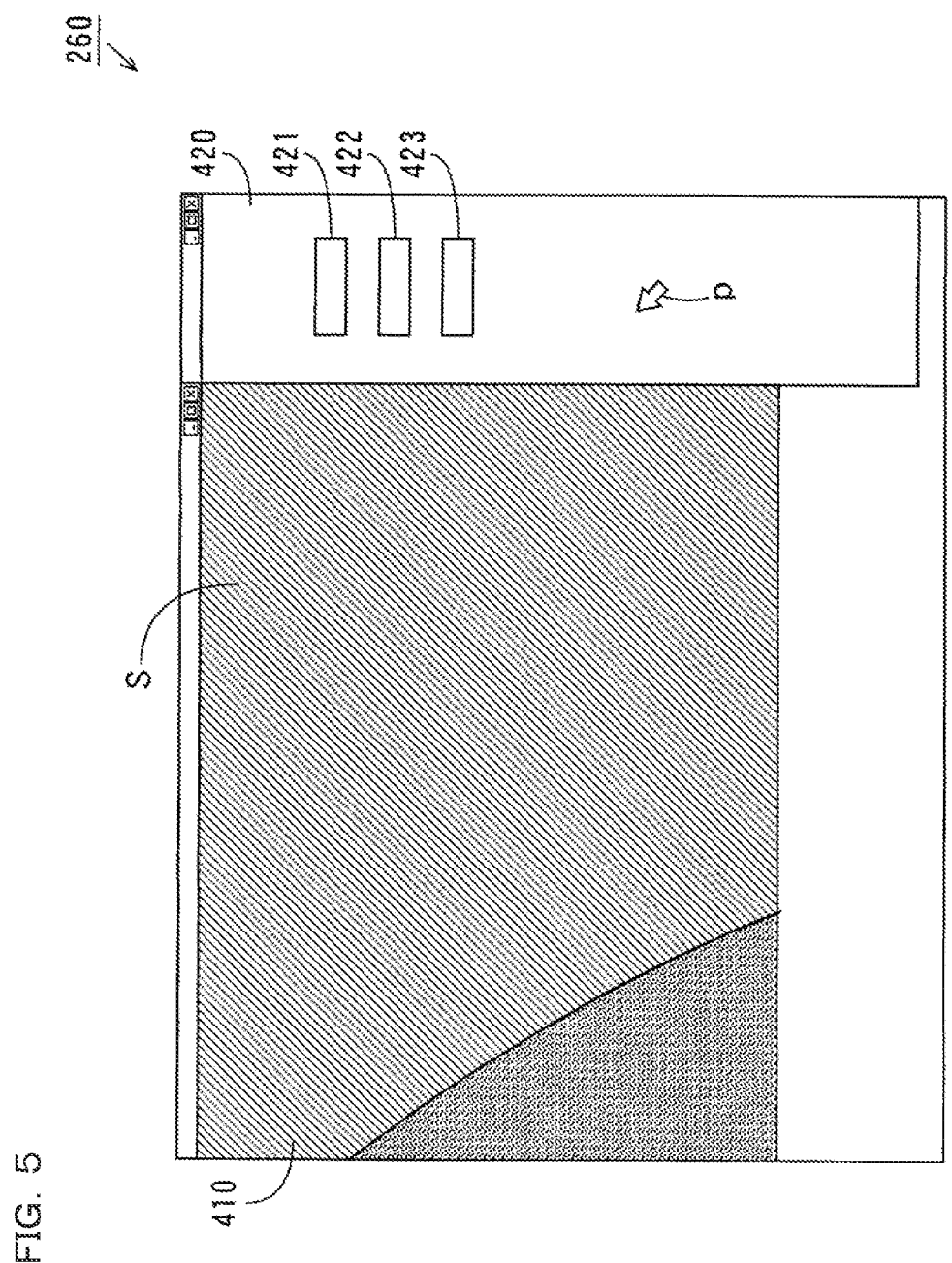
FIG. 5 is a view showing a display example of a display part at the time of imaging an observation object.
Figure 6:
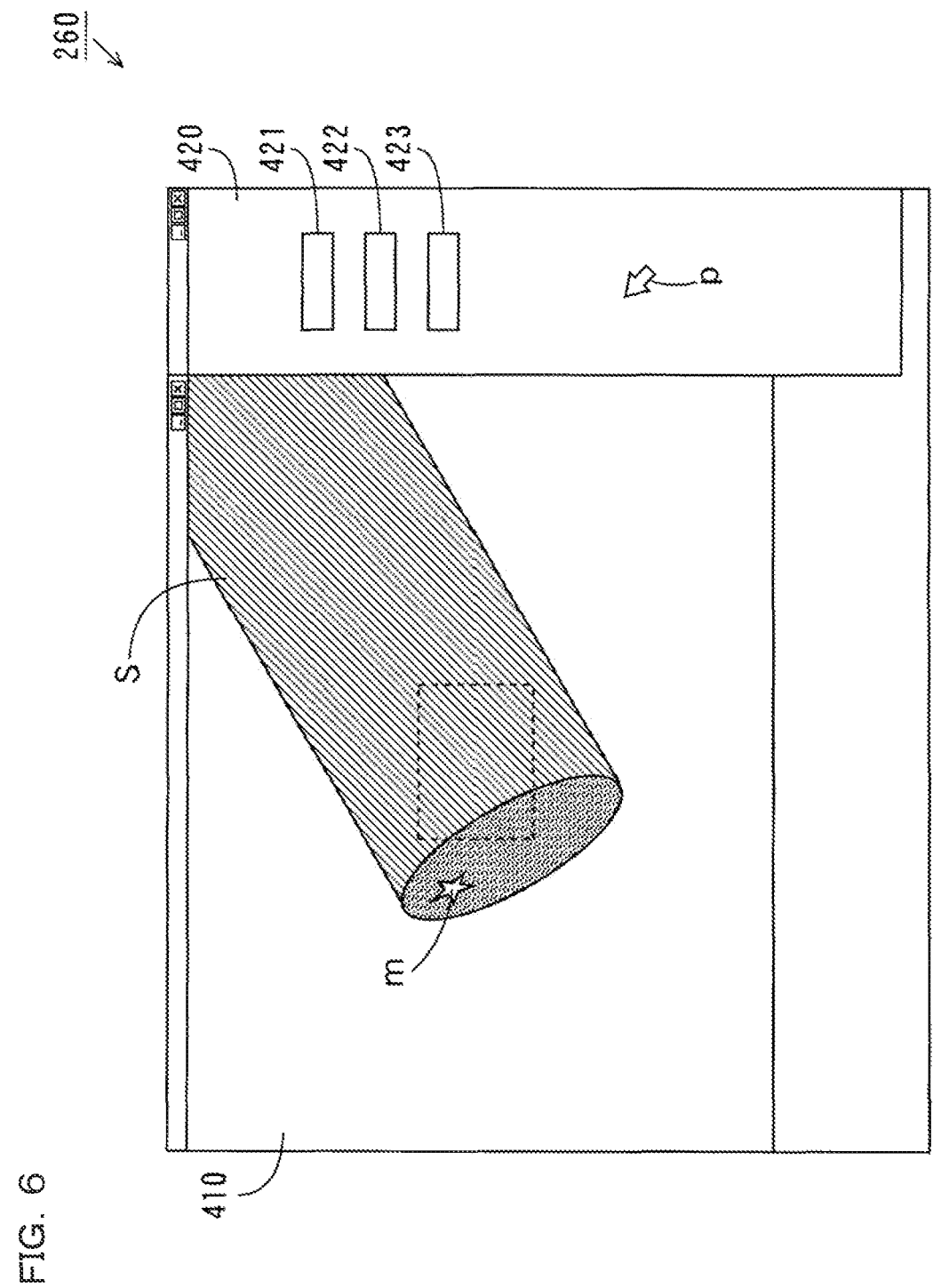
FIG. 6 is a view showing another display example of the display part at the time of imaging the observation object.

FIG. 5 is a view showing a display example of the display part 260 at the time of imaging the observation object S, and FIG. 6 is a view showing another display example of the display part 260 at the time of imaging the observation object S.

As shown in FIGS. 5 and 6, an image display region 410, a condition setting region 420, and a pointer p are displayed on a screen of the display part 260. At the time of imaging the observation object 5, an image based on image data is displayed in the image display region 410, and a first magnification set button 421, a second magnification set button 422 and a connection process button 423 are displayed in the condition setting region 420.

With the observation object S being placed on the stage 21 of FIG. 1, the user operates the first magnification set button 421 by use of the input unit 250 of FIG. 1. The zoom adjusting part 13a is thus controlled, to adjust the magnification of the object lens 13 to the first magnification. As shown in FIG. 5, the CPU 220 displays an image corresponding to the unit region of the observation object S in the image display region 410 of the display part 260.

The user operates the second magnification set button 422 by use of the input unit 250 of FIG. 1. The zoom adjusting part 13a is thus controlled, to adjust the magnification of the object lens 13 to the second magnification. As shown in FIG. 6, the CPU 220 displays an image corresponding to the unit region of the observation object S in the image display region 410 of the display part 260.

As described above, the second magnification is lower than the first magnification. In this case, as shown in FIGS. 5 and 6, the unit region in the case where the first magnification is set is smaller than the unit region in the case where the second magnification is set.

Therefore, in the case of changing the magnification of the object lens 13 from the first magnification to the second magnification, the range of the image of the observation object S displayed in the image display region 410 can be enlarged. In FIG. 6, a dotted line is provided to a portion of images corresponding to the unit region of the observation object S at the time when the magnification of the object lens 13 is the first magnification.

With the image being displayed in the display part 260, the user can move the stage 21 in the x-direction or the y-direction, to thereby change the range of the images of the observation object S displayed in the image display region 410.

The user operates the connection process button 423 by use of the input unit 250 of FIG. 1. Thereby, a later-mentioned magnification observation process is started.

(3) Magnification Observation Process According to First Embodiment

As described above, in the magnification observation device 300 according to the present embodiment, the stage 21 can be moved in the x-direction and the y-direction, to thereby acquire image data of a plurality of unit regions, and the image data of the plurality of unit regions can be connected, to thereby display images of the plurality of unit regions in the display part 260 of FIG. 1. In this case, it is possible to obtain images of the observation object S across a broad range exceeding the unit regions. A process of connecting image data of a plurality of unit regions and displaying the images of the plurality of unit regions in the display part 260 as thus described is referred to as a magnification observation process. The user operates the connection process button 423 of FIG. 5 or 6, to start the magnification observation process.

The magnification observation process started with the magnification of the object lens 13 being set to the first magnification, namely, the magnification observation process in the case of generating images corresponding to a plurality of unit regions at the first magnification, will be described with reference to FIGS. 7 to 11. FIGS. 7 to 11 are views each showing a display example of the display part 260 during the magnification observation process according to the first embodiment.

When the user operates the connection process button 423 of FIG. 5, the CPU 220 of FIG. 1 acquires a digital signal provided from the A/D converter 15 of FIG. 1 as image data corresponding to a first unit region, and stores the acquired image data as first image data into the storage unit 240 of FIG. 1. At this time, the CPU 220 generates first positional information corresponding to the first image data and indicative of a position of the first unit region, and stores the generated first positional information into the storage unit 240 of FIG. 1. Further, the CPU 220 displays an image r1 of the first unit region in the display part 260 of FIG. 1 based on the acquired first image data and first positional information.

The positional information may, for example, be generated based on the foregoing response signal from the stage driving part 22 (FIG. 1) to the movement command signal and the foregoing angle detection signal from the rotational angle sensor 30 (FIG. 1). In this case, the positional information may be a coordinate of each unit region in the X-direction and the Y-direction. Further, in a case where imaged positions of the plurality of unit regions are previously set in imaging order, the positional information may be the order of imaging.

Subsequently, the CPU 220 controls the stage driving part 22 of FIG. 1 to move the stage 21 of FIG. 1 in the x-direction and the y-direction such that regions around the first unit region are imaged.

In the present example, a unit region adjacent to the first unit region is imaged as a second unit region. The CPU 220 acquires a digital signal provided from the A/D converter 15 of FIG. 1 as image data corresponding to the second unit region, and stores the acquired image data as second image data into the storage unit 240 of FIG. 1. At this time, the CPU 220 generates second positional information corresponding to the second image data and indicative of a position of the second unit region, and stores the generated second positional information into the storage unit 240 of FIG. 1. Further, the CPU 220 connects the second image data to the first image data stored in the storage unit 240, and displays an image r2 of the second unit region in the display part 260 of FIG. 1 based on the acquired second image data and second positional information.

It is to be noted that respective parts of the adjacent unit regions are preferably set so as to overlap each other. In this case, it is possible to perform pattern matching between a plurality of pieces of image data corresponding to adjacent unit regions. The pattern matching can be performed, to thereby sequentially connect the acquired image data to the image data corresponding to the adjacent unit region.

Figure 7:
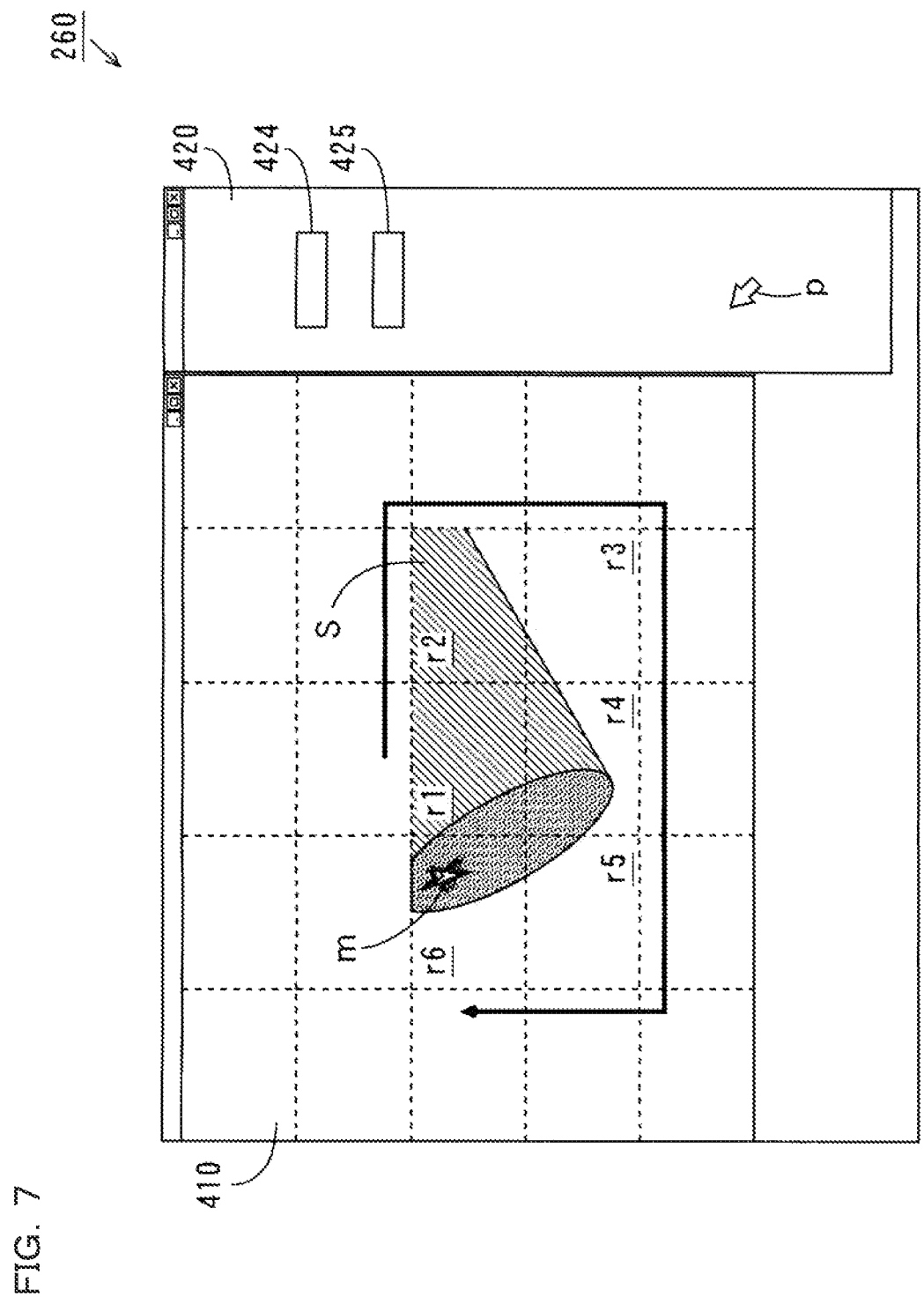
FIG. 7 is a view showing a display example of the display part during a magnification observation process according to the first embodiment.

In such a manner as above, there is repeated a series of operations including movement of the stage 21, imaging of an n-th unit region (n is a natural number not less than 2), storage of image data and positional information, connection of image data, and display of an image. Hereinafter, this series of operations is referred to as a connected image generating operation. The connected image generating operations are repeated, to sequentially display images r1 to r6 of first to sixth unit regions in a spiral form in the image display region 410, for example as shown in FIG. 7. In this state, a re-imaging button 424 and a connection end button 425 are displayed in the condition setting region 420.

In each of FIG. 7 and later-mentioned FIGS. 8, 10, and 11, in order to facilitate understanding of a plurality of images which respectively correspond to a plurality of unit regions being sequentially displayed in the display part 260, the image display region 410 is provided with dotted lines for partitioning the plurality of images corresponding to the plurality of unit regions.

In the magnification observation process according to the present embodiment, the re-imaging button 424 of FIG. 7 can be operated, to thereby selectively re-image any unit region among the plurality of imaged unit regions. An operation at the time of re-imaging will be described.

Figure 8:
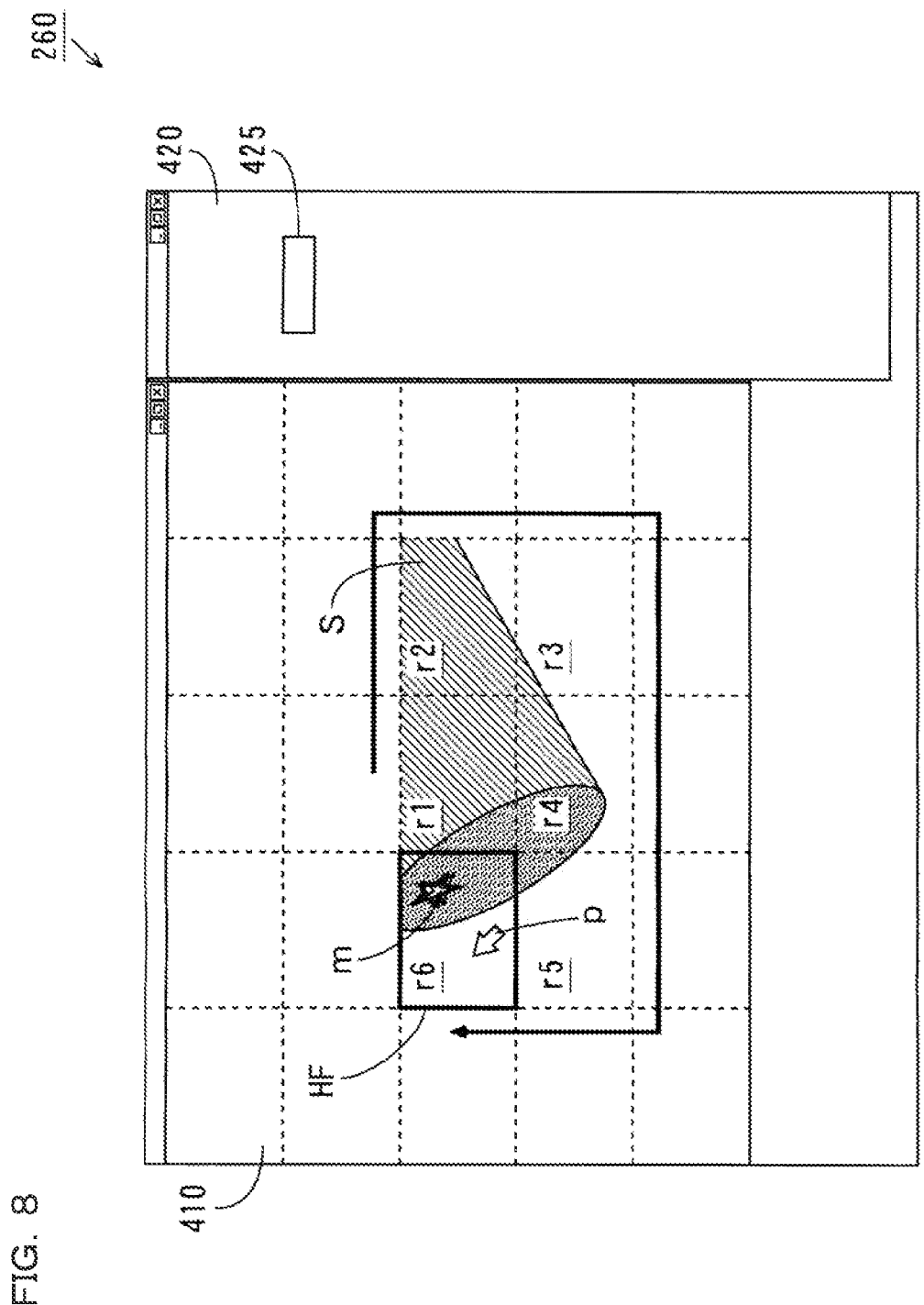
FIG. 8 is a view showing a display example of the display part during the magnification observation process according to the first embodiment.

FIG. 8 shows a display example of the display part 260 in the case of operation of the re-imaging button 424 of FIG. 7. When the user operates the re-imaging button 424, the CPU 220 suspends repetition of the connected image generating operation described above. Further, as shown in FIG. 8, the CPU 220 displays in the display part 260 the images r1 to r6 as a region presentation image based on the plurality of pieces of image data, which were connected until the suspension. At this time, the connection end button 425 is displayed in the condition setting region 420.

In this state, the user can select any of the plurality of images r1 to r6 displayed in the image display region 410 by use of the input unit 250 of FIG. 1, to thereby select a unit region that needs re-imaging among the plurality of unit regions corresponding to the plurality of images r1 to r6.

In the image display region 410, the pointer p is superimposed on any of the plurality of images r1 to r6, to display a selection frame HF surrounding the image superimposed with the pointer p (image r6 in FIG. 8). Thereby, the user can select with ease a unit region that needs re-imaging, while viewing the selection frame HF.

As described above, any of the plurality of images r1 to r6 is selected, to provide the CPU 220 with a signal indicative of a unit region of the selected image as a selection instruction.

In the example of FIG. 8, a star-shaped mark m included in the image r6 of the plurality of images r1 to r6 is unclearly displayed. Thereat, the user selects the image r6 by use of the input unit 250 of FIG. 1. In this case, the CPU 220 accepts a signal indicative of the unit region of the image r6 (sixth unit region), and controls the stage driving part 22 of FIG. 1 to move the stage 21 of FIG. 1 based on the accepted selection instruction and the positional information (sixth positional information in the present example) stored in the storage unit 240, so as to allow imaging of the sixth unit region.

Subsequently, the CPU 220 acquires a digital signal provided from the A/D converter 15 as image data corresponding to the sixth unit region, and displays in the display part 260 of FIG. 1 the image r6 of the sixth unit region based on the acquired image data.

Figure 9:
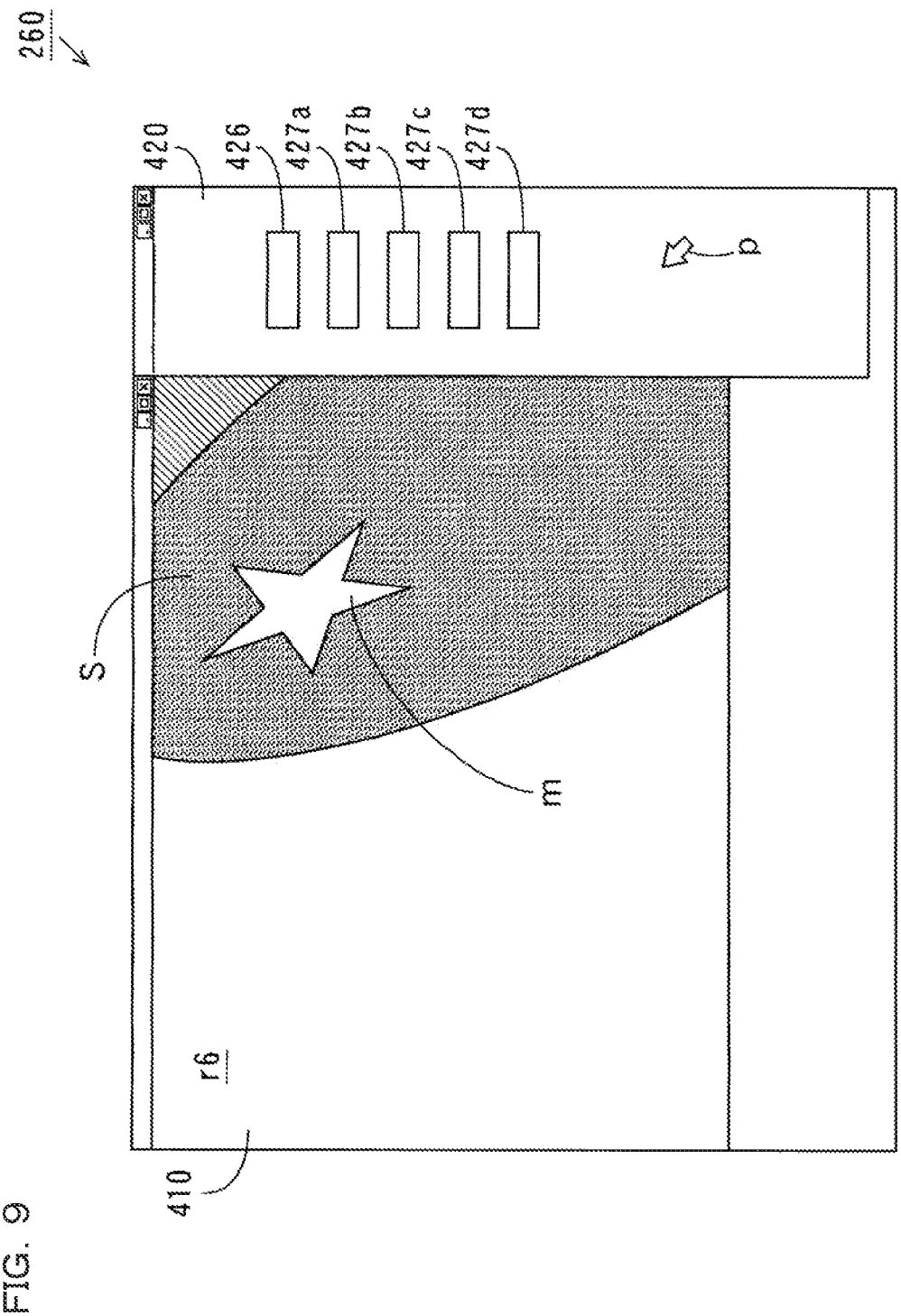
FIG. 9 is a view showing a display example of the display part during the magnification observation process according to the first embodiment.

FIG. 9 shows a display example of the display part 260 in the case where the image r6 of FIG. 8 is selected. As shown in FIG. 9, when the image r6 of FIG. 8 is selected, the image r6 is displayed in an entire region of the image display region 410. Further, a re-imaging decision button 426, a gain adjustment button 427a, an exposure time button 427b, a white balance button 427c, and a focus button 427d are displayed in the condition setting region 420.

In this state, the user can operate the gain adjustment button 427a, the exposure time button 427b, the white balance button 427c, and the focus button 427d, to thereby adjust imaging conditions at the time of re-imaging. Any of the gain adjustment button 427a, the exposure time button 427b, the white balance button 427c, and the focus button 427d is operated, to provide the CPU 220 with an adjustment instruction for adjusting the imaging condition.

The user operates the gain adjustment button 427a. In this case, the CPU 220 accepts a gain adjustment instruction for the color CCD 11 of FIG. 1 as the adjustment instruction for the imaging condition for the unit region. The CPU 220 increases or decreases the gain of the color CCD 11 based on the provided gain adjustment instruction.

The user operates the exposure time button 427b. In this case, the CPU 220 accepts an adjustment instruction for exposure time as the adjustment instruction for the imaging condition for the unit region. The CPU 220 makes a shutter speed long or short based on the provided adjustment instruction for the exposure time.

The user operates the white balance button 427c. In this case, the CPU 220 accepts an adjustment instruction for white balance as the adjustment instruction for the imaging condition for the unit region. Based on the provided adjustment instruction for the white balance, the CPU 220 corrects a value of image data so as to change a color temperature of an image displayed based on the image data.

The user operates the focus button 427d. In this case, the CPU 220 accepts an adjustment instruction for a position in the Z-direction of the object lens 13 (hereinafter, referred to as Z position) as the adjustment instruction for the imaging condition for the unit region. The CPU 220 controls the lens driving part 17 based on the provided adjustment instruction for the Z position, to move the object lens 13 in the Z-direction so as to move a focal position of the object lens 13 in the Z-direction.

The CPU 220 displays in the display part 260 of FIG. 1 the image r6 of the sixth unit region of the observation object S based on image data acquired by imaging on an imaging condition after the adjustment. In this case, the user can adjust a variety of imaging conditions with ease while viewing the image r6 displayed in the image display region 410. For example, the user can adjust the imaging condition with ease so as to make the star-shaped mark m, which is unclearly displayed in the example FIG. 8, clearly displayed while viewing the image r6 shown in the image display region 410.

In the following description, image data acquired by the re-imaging is referred to as re-imaged data, and an image displayed in the display part 260 based on the re-imaged data is referred to as a re-imaged image.

After the adjustment of the imaging condition for the unit region, the user operates the re-imaging decision button 426 of FIG. 9 by use of the input unit 250 of FIG. 1. Thereby, the CPU 220 re-images the sixth unit region on the adjusted imaging condition. The CPU 220 stores the image data, acquired by the re-imaging as re-imaged data corresponding to the sixth unit region, into the storage unit 240 of FIG. 1. At this time, the CPU 220 generates sixth positional information corresponding to the re-imaged data and indicative of a position of the sixth unit region, and stores the generated sixth positional information into the storage unit 240 of FIG. 1.

Further, the CPU 220 replaces the sixth image data, stored before the re-imaging among the plurality of pieces of image data stored in the storage unit 240 of FIG. 1, with the newly stored sixth re-imaged data. Moreover, the CPU 220 connects the sixth re-imaged data to the first to fifth image data.

Subsequently, based on the mutually connected first to fifth image data and the sixth re-imaged data, the CPU 220 displays, in the display part 260 of FIG. 1, the plurality of images r1 to r5 of the first to fifth unit regions and a re-imaged image r6x of the sixth unit region.

The CPU 220 then resumes the suspended connected image generating operation when the next unit region is not an imaged unit region. On the other hand, when the next unit region is an imaged unit region, the CPU 220 sequentially re-images the unit region and subsequent unit regions on the imaging condition after the adjustment, to sequentially acquire re-imaged data respectively corresponding to the unit region and the subsequent unit regions, while storing positional information corresponding to the respective re-imaged data into the storage unit 240 of FIG. 1. Further, the CPU 220 replaces the image data stored in the storage unit 240 of FIG. 1 with the re-imaged data, and displays the re-imaged image in the image display region 410.

Figure 10:
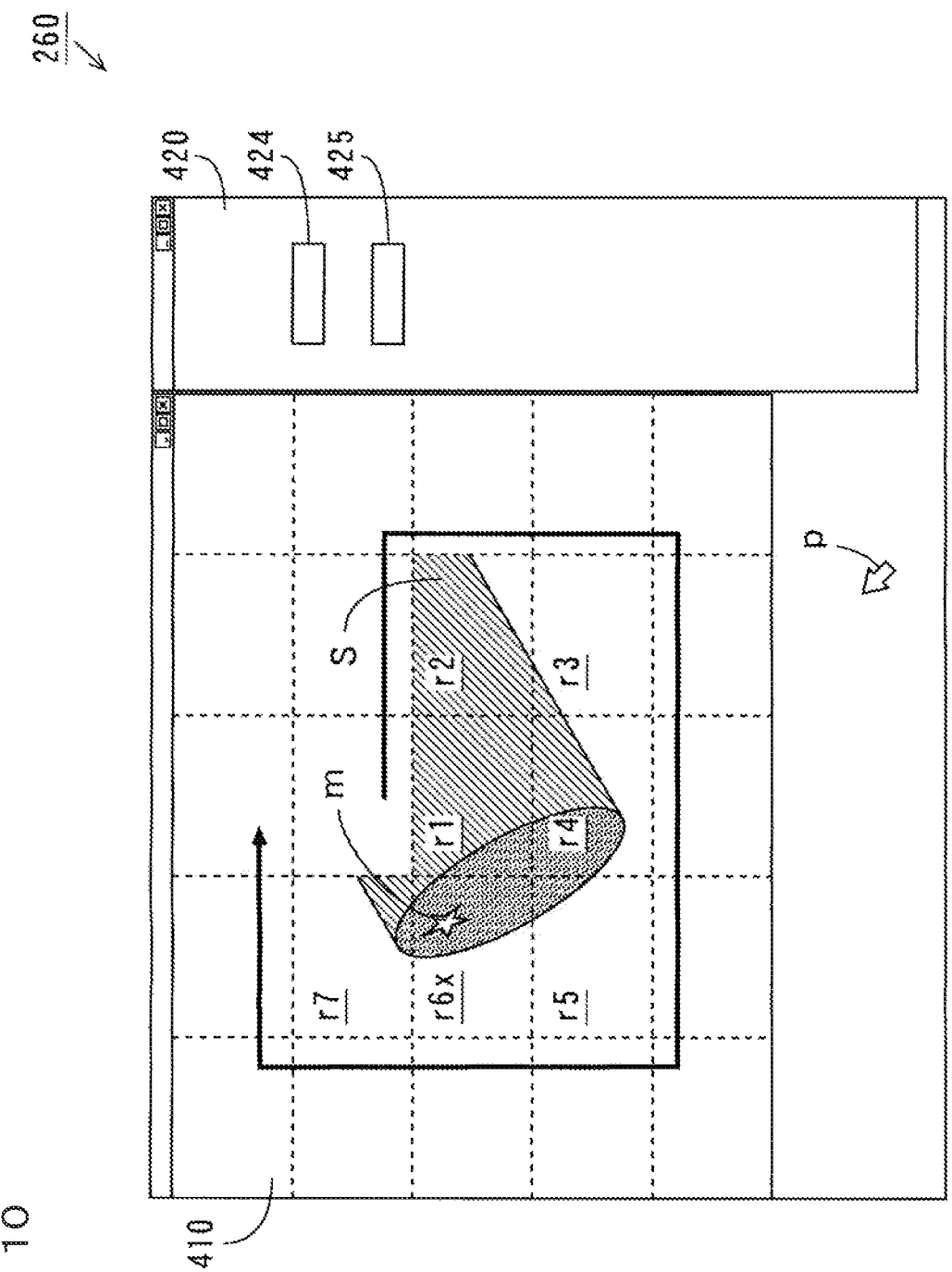
FIG. 10 is a view showing a display example of the display part during the magnification observation process according to the first embodiment.
Figure 11:
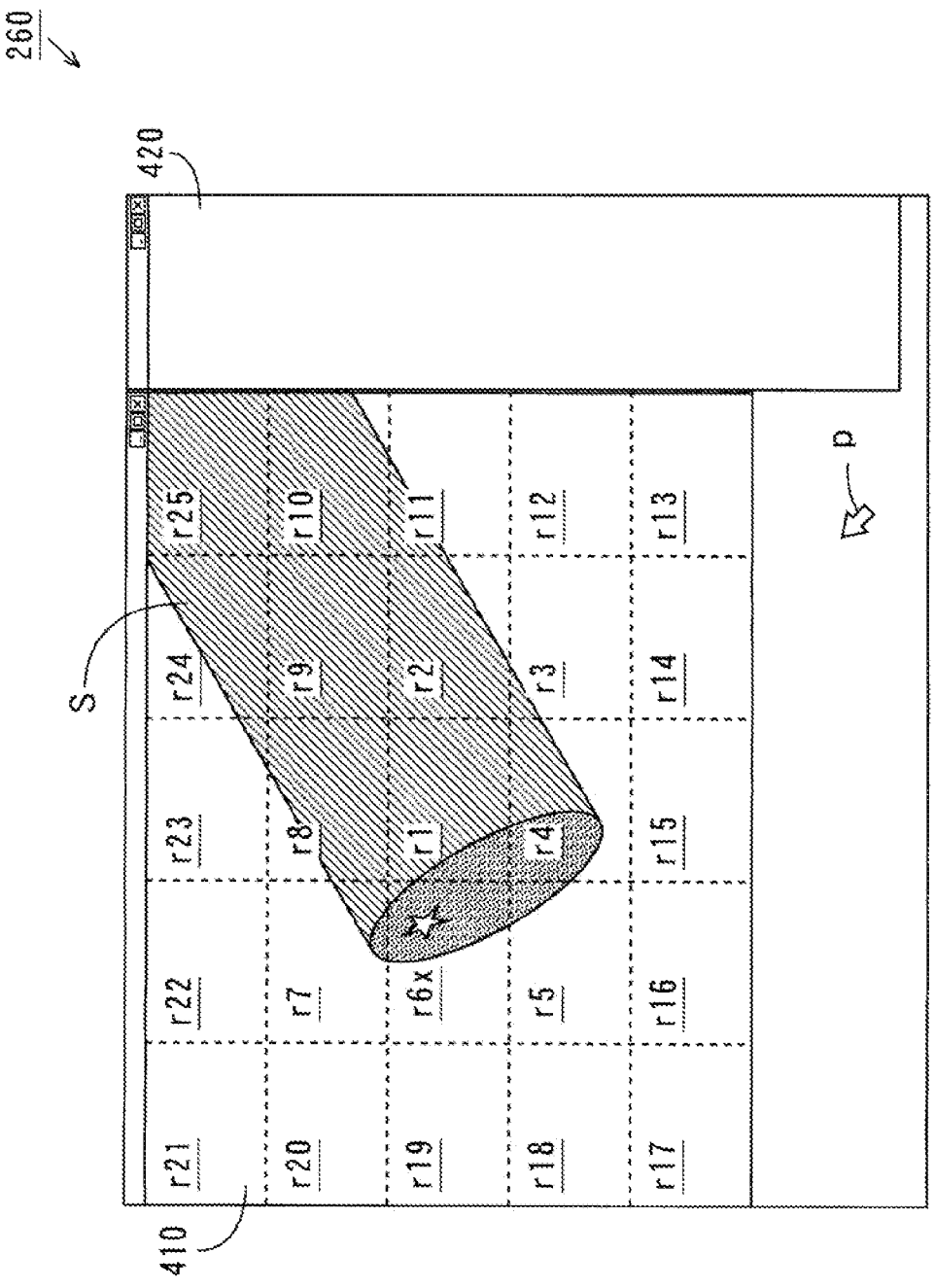
FIG. 11 is a view showing a display example of the display part during the magnification observation process according to the first embodiment.

FIG. 10 shows a display example of the display part 260 after operation of the re-imaging decision button 426 of FIG. 9. As shown in FIG. 10, in the case of operation of the re-imaging decision button 426 of FIG. 9, after re-imaging of the sixth unit region, the above connected image generating operation is resumed. In this case, after replacement of the image r6 of FIG. 8 with the re-imaged image r6x, subsequent unit regions are imaged, and images of the imaged unit regions are sequentially displayed in the image display region 410. In the example of FIG. 10, a seventh image r7 is displayed.

In the present embodiment, in the connected image generating operation after the resumption, the subsequent unit regions are imaged on the imaging condition adjusted at the time of re-imaging. Thereby, the re-imaging can lead to imaging of the subsequent unit regions on an appropriate condition. This is not restrictive, and in the connected image generating operation after the resumption, each unit region may be imaged on an imaging condition set at the time of start of the magnification observation process.

The user operates the connection end button 425 of FIG. 7, 8, or 10 by use of the input unit 250 of FIG. 1. FIG. 11 shows a display example of the display part 260 when the connection end button 425 is operated at the time of imaging of a 25th unit region. By the operation of the connection end button 425, the CPU 220 completes the connected image generating operation. In this case, as shown in FIG. 11, the CPU 220 displays, in the display part 260, the images r1 to r5 and r7 to r25 and the re-imaged image r6*x* as connected images based on the connected plurality of pieces of image data and re-imaged data. Further, the CPU 220 stores into the storage unit 240 the connected image data generated by mutual connection of the plurality of pieces of image data corresponding to the plurality of unit regions and re-imaged data, to complete the magnification observation process. At this time, the CPU 220 also stores into the storage unit 240 positional information respectively corresponding to the plurality of pieces of image data and the re-imaged data which constitute the connected image data.

(4) Effects

In the present embodiment, a plurality of unit regions on the surface of the observation object S are imaged, and based on a plurality of pieces of image data obtained by the imaging, images of the plurality of unit regions are displayed in the display part 260.

In this state, by the operation of the re-imaging button 424 of FIG. 7, the user can select an inappropriate image to thereby select a unit region that needs re-imaging, while viewing the images r1 to r6 of the plurality of imaged unit regions.

Based on the selection instruction by the user and the positional information stored in the storage unit 240, the selected unit region is re-imaged, and the image data stored in the storage unit 240 is replaced with the re-imaged data. Finally, connected image data is generated based on the plurality of pieces of image data and the re-imaged data stored in the storage unit 240.

This can eliminate the need for re-imaging all the unit regions even when part of the plurality of unit regions is not appropriately obtained. Consequently, in the case of re-imaging the observation object S to obtain connected image data corresponding to a plurality of unit regions, the connected image data can be efficiently obtained in a short period of time.

As described above, in the present embodiment, image data corresponding to the unit region to be re-imaged among the plurality of pieces of image data stored in the storage unit 240 of FIG. 1 is replaced with the re-imaged data at the time of re-imaging. This eliminates the need for the user to perform the operation for replacing the image data. Hence, connected image data including the re-imaged data can be obtained with ease.

Instead of replacing the image data with re-imaged data at the time of re-imaging, image data corresponding to the acquired re-imaged data may be stored into the storage unit 240 in a replaceable state. In this case, the user may operate the input unit 250 of FIG. 1 to replace the image data with the re-imaged data.

In the magnification observation process according to the present embodiment, the plurality of unit regions are sequentially imaged in the spiral form such that regions around the first unit region are imaged by the connected image generating operation, and the connection end button 425 is operated, to complete the magnification observation process. In this case, the user can decide with ease the observation object range of the observation object S that needs imaging without previously setting an imaging range, while viewing the plurality of images displayed in the display part 260.

In the present embodiment, after the selection of the unit region to be re-imaged, the unit regions subsequent to the selected unit region are also sequentially re-imaged. Thereby, the plurality of subsequent unit regions are re-imaged only by one-time selection instruction by the user. This simplifies the operation for the selection instruction for the unit region, performed by the user.

As described above, at the time of re-imaging, the CPU 220 may re-image only the selected unit region instead of sequentially re-imaging the selected unit region and the subsequent unit regions. In this case, the imaging condition may be appropriately adjusted with respect to each unit region.

(5) Flow of Magnification Observation Process According to First Embodiment

Figure 12:
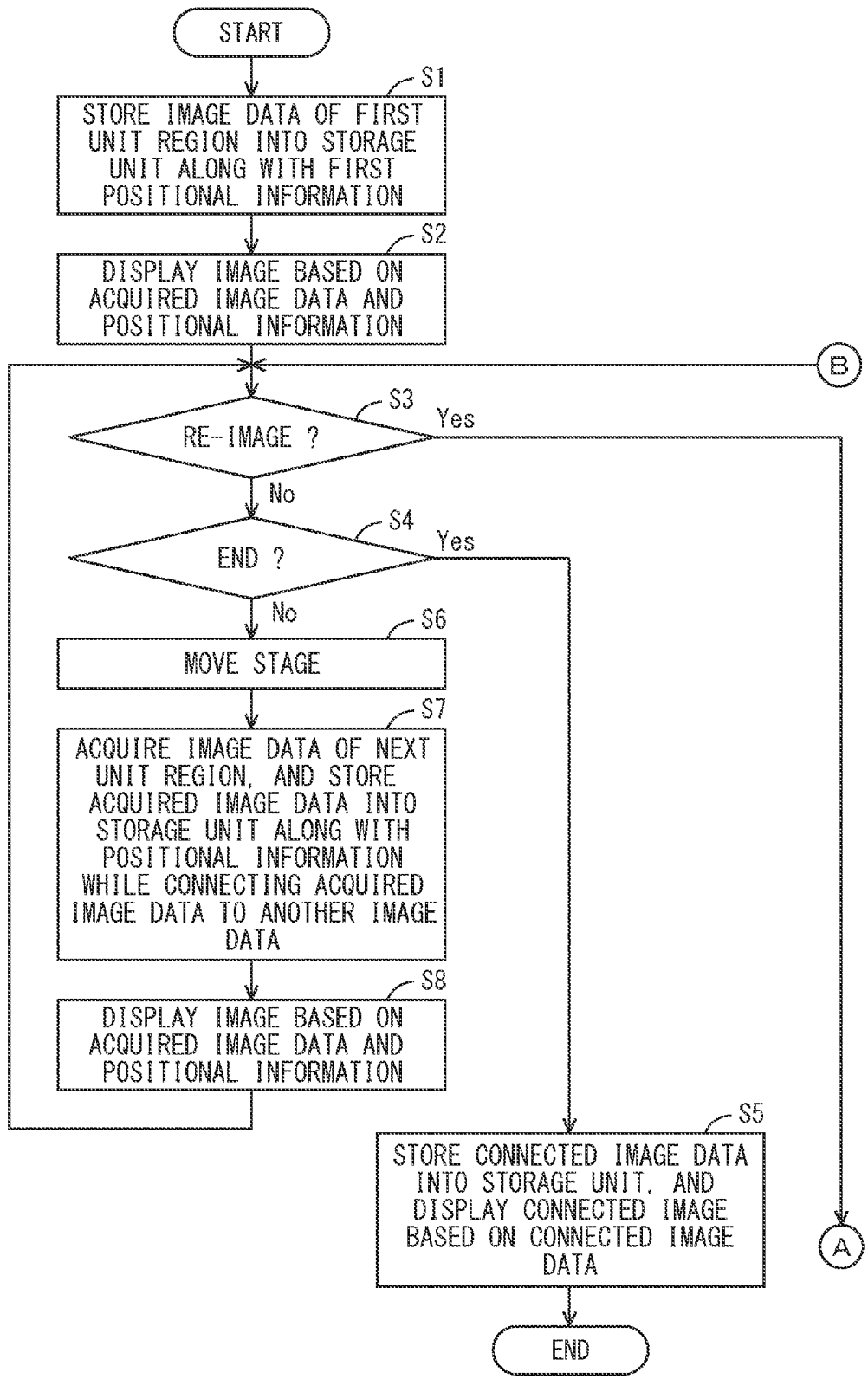
FIG. 12 is a flowchart of a magnification observation process according to the first embodiment.
Figure 13:
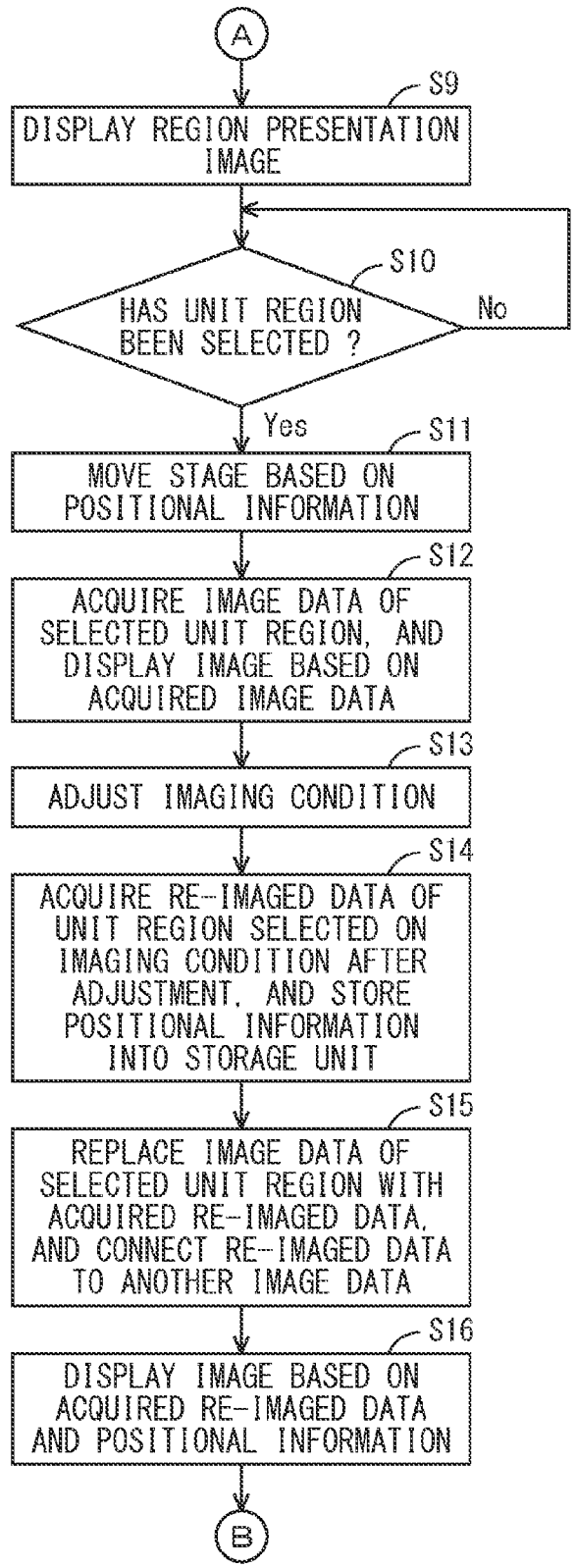
FIG. 13 is a flowchart of the magnification observation process according to the first embodiment.

FIGS. 12 and 13 are flowcharts of the magnification observation process according to the first embodiment. The CPU 220 of FIG. 1 executes a magnification observation program to be stored into the storage unit 240, to perform the magnification observation process according to the present embodiment. In the following flowchart, there will be described an example of re-imaging only a unit region corresponding to an image selected at the time of re-imaging.

In an initial state, previously fixed imaging conditions (gain of the color CCD 11, exposure time, white balance, focal position of the object lens 13, and the like) are set in the magnification observation device 300 by the user's operation.

First, the CPU 220 images a first unit region of the observation object S on the previously set imaging conditions, to acquire image data corresponding to the first unit region and generate first positional information indicative of a position of the first unit region, and stores the acquired image data into the storage unit 240 of FIG. 1 along with the first positional information (step S1). Further, the CPU 220 displays an image of the first unit region in the display part 260 of FIG. 1 based on the acquired image data and the first positional information (step S2).

Next, the CPU 220 determines whether or not a command for re-imaging has been issued (step S3). For example, the CPU 220 determines that the command for re-imaging has been issued when the re-imaging button 424 of FIG. 7 is operated, and determines that the command for re-imaging has not been issued when the re-imaging button 424 is not operated.

When the command for re-imaging has not been issued, the CPU 220 determines whether or not a command for completing the magnification observation process has been issued (step S4). For example, the CPU 220 determines that the command for completing the magnification observation process has been issued when the connection end button 425 of FIG. 7, 8, or 10 is operated, and determines that the command for completing the magnification observation process has not been issued when the connection end button 425 is not operated.

When the command for completing the magnification observation process has been issued, the CPU 220 stores into the storage unit 240 connected image data generated by the plurality of pieces of image data and the re-imaged data, and displays connected images in the display part 260 based on the connected image data (step S5), to complete the magnification observation process.

On the other hand, when the command for completing the magnification observation process has not been issued, the CPU 220 controls the stage driving part 22 of FIG. 1 to move the stage 21 of FIG. 1 so as to image the next unit region (step S6).

The CPU 220 images the next unit region to acquire image data corresponding to that unit region, and generates positional information indicative of a position of the unit region, and stores the acquired image data into the storage unit 240 of FIG. 1 along with the corresponding positional information while connecting the acquired image data to the image data corresponding to the previously stored another unit region (step S7). Further, the CPU 220 displays in the display part 260 of FIG. 1 an image of the unit region based on the acquired image data and positional information (step S8), and returns to the process of step S4.

In step S4 above, when the command for re-imaging has been issued, the CPU 220 displays in the display part 260 images for allowing the user to select a unit region that needs re-imaging as the region presentation image (step S9).

As the region presentation image at this time, there may be used a plurality of images based on all of image data acquired after the start of the magnification observation process and mutually connected to each other, or there may be used a plurality of images based on part of the image data acquired after the start of the magnification observation process and mutually connected to each other. Further, as the region presentation image, for example, there may be used images in which a plurality of non-connected images based on the plurality of pieces of image data are arrayed at fixed intervals.

Thereafter, the CPU 220 determines whether or not any imaged unit region has been selected as a re-imaging object (step S10).

Specifically, by selection of any of the plurality of images displayed in the display part 260 based on an operation of the input unit 250 by the user, the CPU 220 determines that a unit region that needs re-imaging has been selected.

When any unit region is selected, the CPU 220 controls the stage driving part 22 to move the stage 21, so as to image the selected unit region based on the positional information stored in the storage unit 240 of FIG. 1 (step S11).

Subsequently, the CPU 220 images the selected unit region to acquire image data, and displays an image based on the acquired image data in the display part 260 (step S12). In this state, the CPU 220 receives the above adjustment instruction for the imaging condition, to adjust an imaging condition based on the provided adjustment instruction (step S13).

Specifically, by operation of a plurality of buttons (re-imaging decision button 426, gain adjustment button 427a, exposure time button 427b, white balance button 427c, and focus button 427d) of FIG. 9 by the user, the CPU 220 adjusts a variety of imaging conditions based on the provided adjustment instruction. It is to be noted that, when there is no previously set adjustment instruction for a predetermined period of time, the CPU 220 does not adjust the imaging condition.

Thereafter, the CPU 220 re-images the selected unit region on the imaging condition after the adjustment, to acquire re-imaged data corresponding to the selected unit region, and stores positional information corresponding to the re-imaged data into the storage unit 240 (step S14).

Next, the CPU 220 replaces image data of the selected unit region with the acquired re-imaged data in the storage unit 240, and connects the acquired re-imaged data to another image data (step S15).

Subsequently, the CPU 220 displays in the display part 260 an image of the unit region selected based on the acquired re-imaged data and positional information (step S16), and returns to the process of step S4.

In the flowcharts of FIGS. 12 and 13, for example, a series of processing operations including steps S4, S6, S7, and S8 corresponds to the connected image generating

[2] Second Embodiment

Concerning a magnification observation device, a magnification observation method, and a magnification observation program according to a second embodiment, a difference from those in the first embodiment will be described.

The magnification observation device according to the second embodiment has the same configuration as that of the magnification observation device 300 of FIG. 1, but has a different magnification observation program that is stored in the storage unit 240. For this reason, the magnification observation process according to the second embodiment is different from the magnification observation process according to the first embodiment. Hereinafter, a detail of the magnification observation process according to the second embodiment will be described.

(1) Magnification Observation Process According to Second Embodiment

In the present embodiment as well, when the observation object S is imaged, a similar image to that of FIG. 5 or 6 is displayed in the display part 260 of FIG. 1 in accordance with a magnification of the object lens 13. In this state, the user operates the connection process button 423 of FIG. 5 or 6 by use of the input unit 250 of FIG. 1, and the magnification observation process is thereby started.

There will be described the magnification observation process performed with the magnification of the object lens 13 being set to the first magnification, namely, the magnification observation process in the case of generating images corresponding to a plurality of unit regions at the first magnification.

First, an observation object range of the observation object S that needs imaging is set. For example, the user inputs information on the observation object range by use of the input unit 250 of FIG. 1. Based on the input information, the CPU 220 of FIG. 1 sets the observation object range of the observation object S. Further, when the observation object range is larger than the unit region, the CPU 220 sets positions of a plurality of unit regions that need imaging within the set observation object range. Thereafter, the CPU 220 controls each constitutional element of the microscope 100 so as to sequentially image the plurality of set unit regions.

In the present embodiment, at the time of setting the above observation object range, the observation object S is imaged at the second magnification which is lower than the first magnification. In this case, the CPU 220 acquires image data corresponding to the unit region at the time of the second magnification being set, and generates positional information indicative of a position of that unit region, to store the acquired image data into the storage unit 240 of FIG. 1 along with the positional information.

At this time, the second magnification of the object lens 13 may be, for example, automatically set by the CPU 220 at the start of setting the observation object range, or set by the user operating the zoom adjusting part 13a of FIG. 1 before the start of setting the observation object range.

In the present embodiment, the CPU 220 automatically sets the imaging condition at the start of imaging each unit region during the magnification observation process. This automatic setting will be specifically described. In the following specific example, the CPU 220 automatically sets the Z position of the object lens 13 as automatic setting of the imaging condition.

At the start of imaging each unit region, the CPU 220 controls the lens driving part 17 of FIG. 1 with the unit region opposed to the object lens 13, to move the object lens 13 in the Z-direction, and images the unit region while moving a focal position of the object lens 13 in the Z-direction. At this time, the CPU 220 detects the Z position (hereinafter, referred to as focal position) of the object lens 13 when the focus of the object lens 13 agrees with the surface of the unit region based on the image data provided from the A/D converter 15. Subsequently, the CPU 220 moves the object lens 13 to the detected focal position. In such a manner, the Z position of the object lens 13 at the time of imaging is set to the focal position.

In this case, the unit region is imaged with the Z position of the object lens 13 automatically set to the focal position. Since the unit region is thus imaged with the object lens 13 in an in-focus state, the user can obtain with ease an in-focus image with respect to each unit region.

On the other hand, the focal position is not necessarily detected. For example, when a large step is present on the surface of the observation object S within one unit region, it may not be possible to detect a focal position with respect to the unit region. When the focal position is not detected, the CPU 220 sets the Z position of the object lens 13 to a previously set position (e.g., position set in the previously imaged unit region, or the like), and stores information (hereinafter, referred to as abnormal information) indicating that the imaging condition (Z position of the object lens 13 in the present example) has not been normally set in the unit region into the storage unit 240 of FIG. 1.

As described above, by imaging of all the unit regions within the observation object range, a plurality of pieces of image data respectively corresponding to all the unit regions are stored into the storage unit 240 along with a plurality of pieces of respectively corresponding positional information. When a focal position is not detected in part or all of the unit regions, abnormal information on the part or all of the unit regions is stored into the storage unit 240.

As described above, after imaging of all the unit regions within the observation object range, the CPU 220 displays in the display part 260 of FIG. 1 an image (hereinafter, referred to as a low-magnification image) which has been acquired by imaging the observation object S at the second magnification at the time of setting the observation object range and is based on the image data stored in the storage unit 240, as a region presentation image. In the present embodiment, the second magnification is preferably set such that the low-magnification image displayed in the display part 260 includes the entire image in the observation object range.

Figure 14:
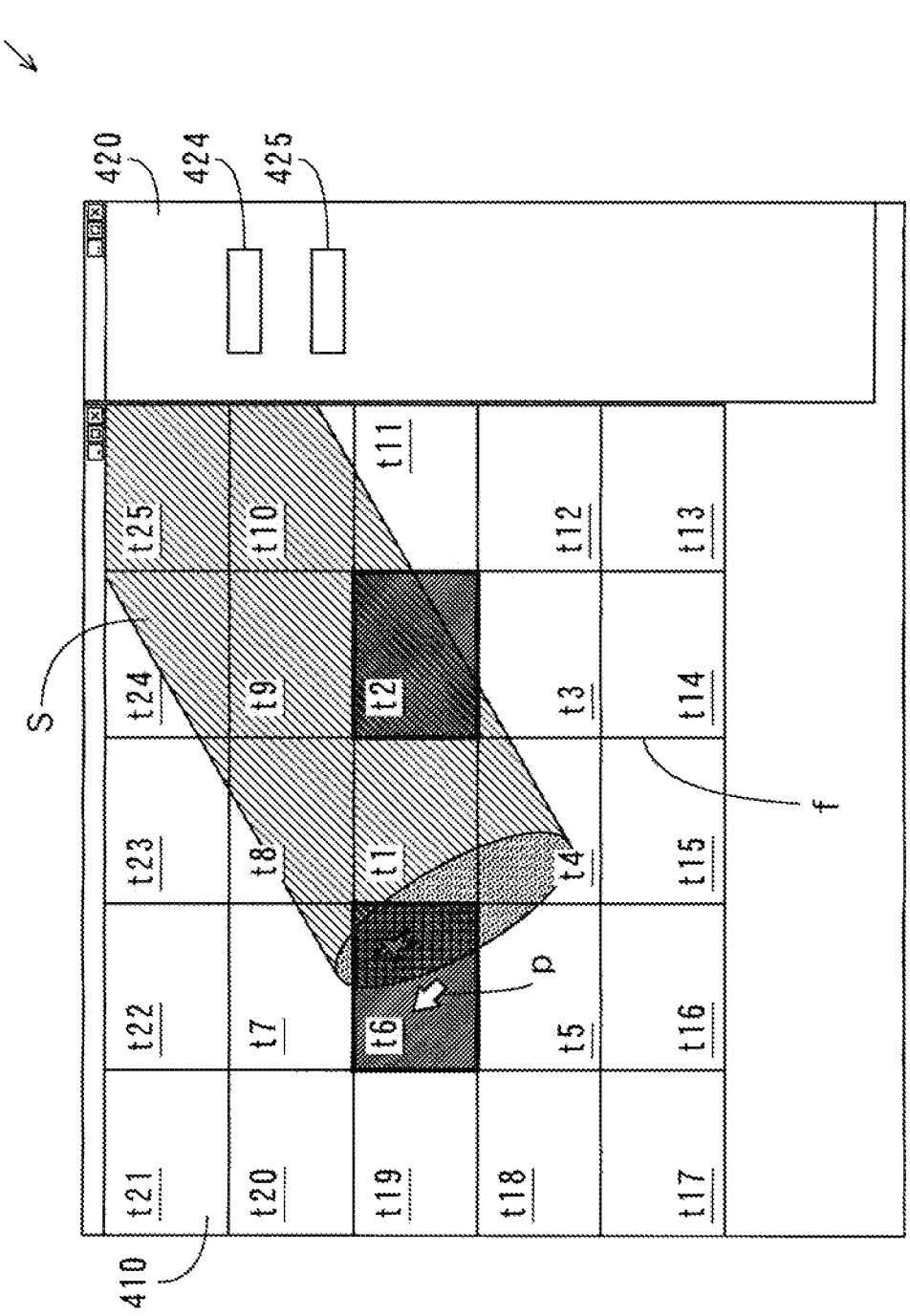
FIG. 14 is a view showing a display example of the display part during a magnification observation process according to a second embodiment.

FIG. 14 is a view showing a display example of the display part 260 during the magnification observation process according to the second embodiment. As shown in FIG. 14, in the magnification observation process according to the second embodiment, all the unit regions within the observation object range are imaged, to display a low-magnification image of the observation object S as a region presentation image in the image display region 410.

In this state, the CPU 220 of FIG. 1 displays within the image display region 410 a plurality of region frames f surrounding portions corresponding to the plurality of unit regions imaged at the first magnification. Thereby, in the example of FIG. 14, the low-magnification image displayed within the image display region 410 is partitioned by the plurality of region frames f into twenty-five low-magnification images t1 to t25.

Further, based on the abnormal information stored in the storage unit 240, the CPU 220 determines whether or not the imaging condition has been normally set in each unit region. Thus, the CPU 220 determines whether or not the imaging condition has been normally set in each unit region, and highlights the low-magnification image (low-magnification images t2, t6 in the example of FIG. 14) corresponding to the unit region determined not to have been normally set with the imaging condition, based on the positional information stored in the storage unit 240. FIG. 14 presents the highlights by dark hatching.

This facilitates the user to recognize that the imaging condition has not been normally set in the unit regions corresponding to the highlighted low-magnification images t2, t6, and those unit regions were thereby not imaged on an appropriate imaging condition (Z position of the object lens 13 in this example). At this time, the re-imaging button 424 and the connection end button 425 are displayed in the condition setting region 420.

In the present embodiment, the region presentation image is used for showing the unit region having not been normally set with the imaging condition. For this reason, differently from the first embodiment, it is not necessary in the second embodiment to display in the display part 260 a plurality of images based on image data acquired by imaging at the first magnification.

Also in the magnification observation process according to the present embodiment, the user can operate the re-imaging button 424 of FIG. 14, to thereby selectively re-image any of the plurality of imaged unit regions at the first magnification.

For example, when the user operates the re-imaging button 424, the CPU 220 comes into a standby state until receiving a selection instruction. In this state, the user selects any of the low-magnification images t1 to t25 displayed in the image display region 410 by use of the pointer p. Thereby, the CPU 220 is provided with a selection instruction indicative of a unit region that needs re-imaging among the plurality of unit regions corresponding to the low-magnification images t1 to t25.

As described above, in the present embodiment, the low-magnification images t2, t6 portions corresponding to the unit regions having not been normally set with the imaging condition are highlighted. Therefore, the user can view the highlighted low-magnification images t2, t6, to thereby preferentially select the unit region having not been normally set with the imaging condition as the unit region that needs re-imaging.

The user selects the low-magnification image t6, to provide the CPU 220 with a signal indicative of the unit region corresponding to the low-magnification image t6 as the selection instruction. In this case, the CPU 220 images the selected unit region at the first magnification based on the provided selection instruction and the positional information stored in the storage unit 240. Further, similarly to the example of FIG. 9, the CPU 220 displays the low-magnification image t6 in the entire region of the image display region 410, and displays the re-imaging decision button 426, the gain adjustment button 427a, the exposure time button 427b, the white balance button 427c, and the focus button 427d in the condition setting region 420.

In this state, the user can operate the gain adjustment button 427a, the exposure time button 427b, the white balance button 427c, and the focus button 427d, to thereby adjust the imaging conditions for the unit region.

Thereafter, the CPU 220 re-images the selected unit region on the imaging condition after the adjustment, to acquire re-imaged data, and stores the acquired re-imaged data into the storage unit 240 of FIG. 1. Further, the CPU 220 generates positional information corresponding to the re-imaged data, and stores the generated position information into the storage unit 240. At this time, the CPU 220 replaces the image data corresponding to the previously stored unit region with the re-imaged data.

Subsequently, the CPU 220 returns the displayed state of the display part 260 to the display state of FIG. 14 again. In this case, the user can operate the re-imaging button 424 again while selecting the low-magnification image t2, to thereby re-image the unit region of the observation object S which corresponds to the low-magnification image t2 at the first magnification.

When the user finally operates the connection end button 425 of FIG. 14, the CPU 220 connects between the plurality of pieces of image data and the re-imaged data which are stored in the storage unit 240, to generate connected image data corresponding to the observation object range. The CPU 220 displays in the display part 260 a connected image in the observation object range based on the connected image data, while storing the generated connected image data into the storage unit 240, and completes the magnification observation process. At this time, the CPU 220 stores into the storage unit 240 positional information of each unit region along with the plurality of pieces of image data and the re-imaged data that constitute the connected image data.

(2) Effects

In the present embodiment, the low-magnification image is used as the region presentation image for the user to select a unit region that needs re-imaging. In this case, the low-magnification image can be displayed by means of a small capacity of image data. This eliminates the need for spending a long period of time on generation of image data for displaying the low-magnification image. Further, it is possible to prevent an amount of the image data for displaying the low-magnification image from exceeding a usable capacity of the operation memory 270 of FIG. 1.

At the start of imaging each unit region, the Z position of the object lens 13 is automatically set to the focal position as the imaging condition. When the focal position of the object lens 13 is not detected, abnormal information indicating that the imaging condition has not been normally set in the unit region is stored into the storage unit 240. Based on the stored abnormal information, it is determined whether or not the imaging condition has been normally set in each unit region. A portion of the low-magnification image which corresponds to the unit region having not been normally set with the imaging condition is highlighted. Thereby, the user can view the low-magnification image including the highlight, to thereby recognize with ease the unit region having not been normally set with the imaging condition. Therefore, the user can re-image with ease the unit region having not been normally set with the imaging condition.

(3) Flow of Magnification Observation Process According to Second Embodiment

Figure 15:
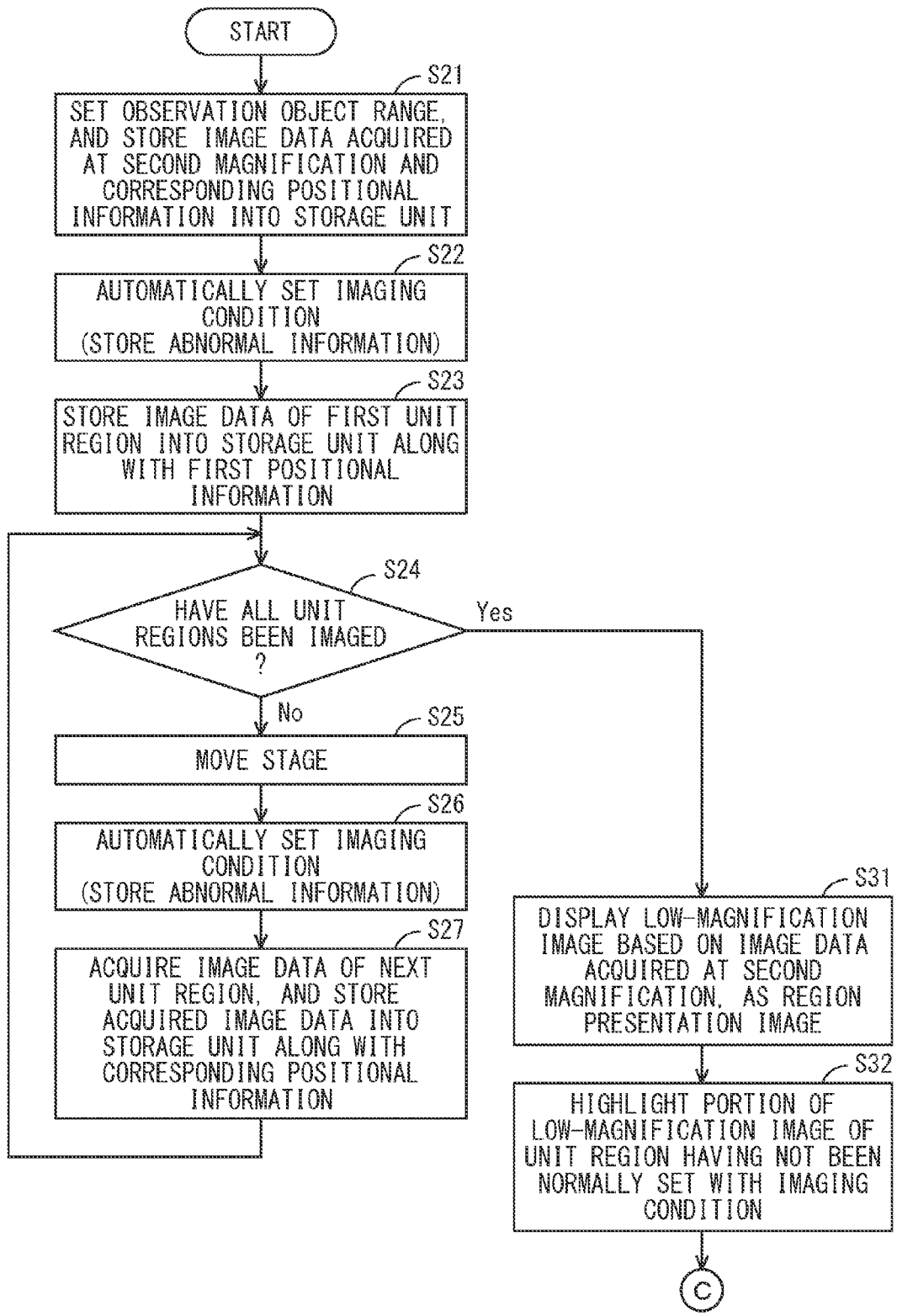
FIG. 15 is a flowchart of the magnification observation process according to the second embodiment.
Figure 16:
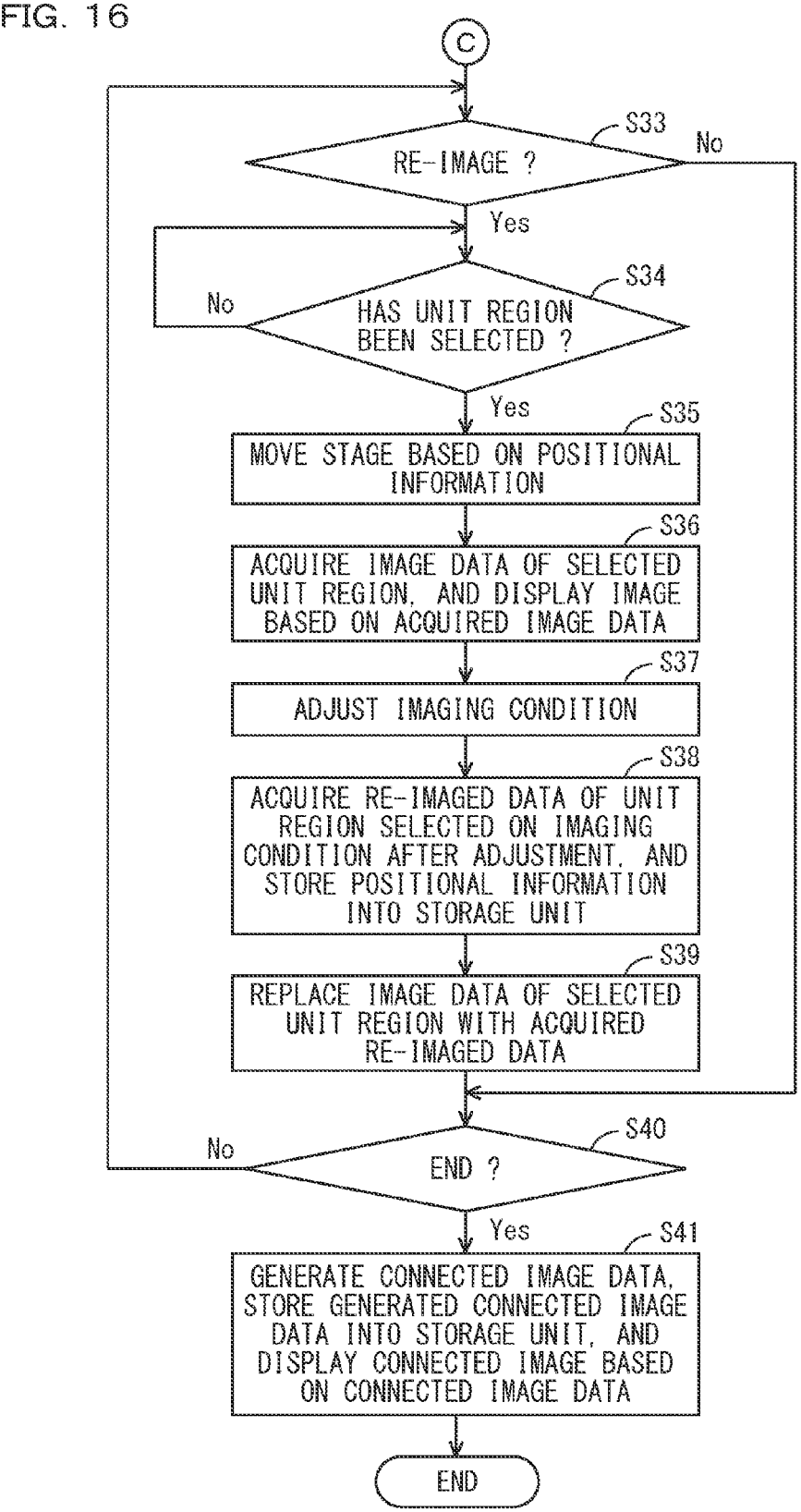
FIG. 16 is a flowchart of the magnification observation process according to the second embodiment.

FIGS. 15 and 16 are flowcharts of the magnification observation process according to the second embodiment. The CPU 220 of FIG. 1 executes the magnification observation process in accordance with the magnification observation program stored in the storage unit 240 of FIG. 1.

In the present example, the magnification of the object lens 13 is set to the second magnification in an initial state. Further, in the initial state, previously fixed imaging conditions (gain of the color CCD 11, exposure time, white balance, and the like) are set in the magnification observation device 300 by the user's operation. It is to be noted that the Z position of the object lens 13 of FIG. 1 has not been set in the initial state.

First, the CPU 220 sets the observation object range, and images the observation object S at the second stage, to store the acquired image data into the storage unit 240 of FIG. 1 along with positional information corresponding thereto (step S21). As described above, the CPU 220 sets the observation object range of the observation object S based on, for example, information inputted from the input unit 250 of FIG. 1. Further, when the observation object range is larger than the unit region, the CPU 220 sets positions of a plurality of unit regions that need imaging within the set observation object range.

After the process of step S21, the magnification of the object lens 13 is changed from the second magnification to the first magnification by the user operating the input unit 250 of FIG. 1 or by the user operating the zoom adjusting part 13a of FIG. 1.

Next, the CPU 220 automatically sets the imaging condition with respect to a first unit region of the observation object S (step S22). In the present example, the CPU 220 automatically sets the Z position of the object lens 13 as the imaging condition. As described above, the CPU 220 stores the above abnormal information into the storage unit 240 when being unable to detect the focal position of the object lens 13 at the time of automatic setting.

Subsequently, the CPU 220 images a first unit region with the Z position of the object lens 13 in the automatically set state, to acquire image data corresponding to the first unit region, generates first positional information indicative of a position of the first unit region, and stores the acquired image data into the storage unit 240 along with the first positional information (step S23).

Next, the CPU 220 determines whether or not all the unit regions within the observation object range, set in step S21, have been imaged (step S24). Specifically, the CPU 220 determines whether or not a plurality of pieces of image data corresponding to all the unit regions within the observation object range have been stored into the storage unit 240.

When all the unit regions within the observation object range are not imaged, the CPU 220 controls the stage driving part 22 of FIG. 1 to move the stage 21 of FIG. 1 so as to image the next unit region of the observation object S (step S25).

Similarly to step S22 above, the CPU 220 automatically sets the imaging condition with respect to the next unit region to be imaged (step S26). Further, the CPU 220 stores the above abnormal information into the storage unit 240 when being unable to detect the focal position of the object lens 13 at the time of automatic setting.

Next, the CPU 220 images the next unit region with the Z position of the object lens 13 in the automatically set state, to thereby acquire image data corresponding to that unit region, and stores the acquired image data into the storage unit 240 along with positional information corresponding to the acquired image data (step S27). Thereafter, the CPU 220 returns to the process of step S24.

In step S24, when all the unit regions within the observation object range are imaged, the CPU 220 displays in the display part 260 a low-magnification image based on the image data stored into the storage unit 240 in step S21 as the region presentation image (step S31). It is to be noted that the CPU 220 may perform the following process instead of storing the image data into the storage unit 240 in step S21.

For example, when all the unit regions within the imaging range are imaged in step S24, the CPU 220 may change the magnification of the object lens 13 to the second magnification which is lower than the first magnification, and images the observation object S at the second magnification. In this case, the CPU 220 can display in the display part 260 a low-magnification image based on the acquired image data as the region presentation image.

Subsequently, when the abnormal information is stored in the storage unit 240, the CPU 220 determines whether or not the imaging condition has been normally set in each unit region based on the stored abnormal information, and highlights a portion of the low-magnification image which corresponds to a unit region having not been normally set with the imaging condition (step S32).

It should be noted that, instead of the highlight, the CPU 220 may display a letter, a symbol, a frame, or the like in the portion of the low-magnification image which corresponds to the unit region having not been normally set with the imaging condition. In this case, the user can view the letter, the symbol, the frame, or the like, to thereby recognize with ease the unit region having not been imaged on an appropriate condition.

Next, the CPU 220 determines whether or not a command for re-imaging has been issued (step S33). For example, the CPU 220 determines that the command for re-imaging has been issued when the re-imaging button 424 of FIG. 14 is operated, and determines the command for re-imaging has not been issued when the re-imaging button 424 is not operated. When the command for re-imaging has not been issued, the CPU 220 proceeds to a process of step S40, to be described later.

On the other hand, when the command for re-imaging has been issued, the CPU 220 determines whether or not any imaged unit region has been selected as a re-imaging object, while displaying the low-magnification image in the display part 260 (step S34).

When any unit region is selected, the CPU 220 controls the stage driving part 22 to move the stage 21, so as to image the selected unit region based on the positional information stored in the storage unit 240 of FIG. 1 (step S35).

Subsequently, the CPU 220 images the selected unit region to acquire image data, and displays an image based on the acquired image data in the display part 260 (step S36). In this state, the CPU 220 receives the adjustment instruction for the imaging condition, to adjust an imaging condition based on the provided adjustment instruction (step S37). Specifically, similarly to the first embodiment, by operation of a plurality of buttons (re-imaging decision button 426, gain adjustment button 427a, exposure time button 427b, white balance button 427c, and focus button 427d) of FIG. 9 by the user, the CPU 220 adjusts a variety of imaging conditions based on the provided adjustment instruction.

Thereafter, the CPU 220 images the selected unit region of the observation object S on the imaging condition after the adjustment, to acquire re-imaged data corresponding to the selected unit region, and stores positional information corresponding to the re-imaged data into the storage unit 240 (step S38). Further, the CPU 220 replaces the image data of the selected unit region with the acquired re-imaged data in the storage unit 240 (step S39).

Next, the CPU 220 determines whether or not a command for completing the magnification observation process has been issued (step S40). For example, the CPU 220 determines that the command for completing the magnification observation process has been issued when the connection end button 425 of FIG. 14 is operated, and that the command for completing the magnification observation process has not been issued when the connection end button 425 is not operated.

When the command for completing the magnification observation process has been issued, the CPU 220 connects between the plurality of pieces of image data and the re-imaged data which are stored in the storage unit 240, to generate connected image data, and displays a connected image based on the connected image data in the display part 260 while storing the generated connected image data into the storage unit 240 (step S41). Thereby, the magnification observation process is completed. On the other hand, when the command for completing the magnification observation process has not been issued, the CPU 220 returns to the process of step S33.

[3] Other Embodiments (1) In the first and second embodiments, the magnification observation process is performed in the magnification observation device 300 provided with the microscope 100 for observing the surface of the observation object S by use of white light. These are not restrictive, and the magnification observation process can be applied to another magnification observation device that enlarges the surface of the observation object S and observes the enlarged surface. As such a magnification observation device, for example, there are a magnification observation device provided with a microscope using optical interferometry, a magnification observation device provided with a confocal microscope, a magnification observation device provided with an electron scanning microscope, a magnification observation device provided with a scanning probe microscope, and a magnification observation device provided with a fluorescence microscope, and the like.

(2) In the first and second embodiments, as the examples of the adjustment instruction for the imaging condition for the unit region, there were described the adjustment instruction for the gain of the color CCD 11 of FIG. 1, the adjustment instruction for the exposure time, the adjustment instruction for white balance, and the adjustment instruction for the Z position of the object lens 13. These are not restrictive, and the CPU 220 of FIG. 1 may accept the following adjustment instruction as the adjustment instruction for the imaging condition for the unit region of the observation object S.

(2-1) The CPU 220 may accept an adjustment instruction for relative positions of the observation object S and the object lens 13 in the X-direction and the Y-direction as the adjustment instruction for the imaging condition of the unit region. In this case, the CPU 220 controls the stage driving part 22 of FIG. 1 based on the adjustment instruction, to move the stage 21 in the x-direction and the y-direction.

(2-2) As the adjustment instruction for the imaging condition for the unit region, the CPU 220 may accept an adjustment instruction for a light amount of the illumination light source 16 of FIG. 1 or an adjustment instruction with regard to an opening of a diaphragm (not shown) or a transmittance of a filter (not shown). In this case, the CPU 220 adjusts the light amount of the illumination light source 16, the opening of the diaphragm (not shown) or the transmittance of the filter (not shown) based on the adjustment instruction.

(2-3) When an amount of reflected light from the surface of the observation object S is large, an electric signal of the color CCD 11 may be saturated. In this case, acquired image data indicates the maximal value. For this reason, even when an image based on the acquired image data is displayed, the user cannot recognize the state of the surface of the observation object S. Thereat, the gain of the color CCD 11 can be set low, to thereby prevent saturation of the electric signal of the color CCD 11.

On the other hand, when the level of the electric signal of the color CCD 11 becomes too low due to a small amount of the reflected light from the surface of the observation object S, image data acquired based on the reflected light cannot be accurately identified. Thereat, the gain of the color CCD 11 can be set high, to make the level of the electric signal of the color CCD 11 high, thereby accurately identifying the image data.

There may be cases where a region with a large amount of reflected light (hereinafter, referred to as high-reflection region) is mixed with a region with a small amount of reflected light (hereinafter, referred to as low-reflection region), depending on the state of the surface of the observation object S. When the high-reflection region and the low-reflection region are included within a region to be imaged, the state of the surface of the observation object S cannot be accurately observed unless the gain of the color CCD 11 is set to a different value with respect to each of the high-reflection region and the low-reflection region.

Hence, there is a method of sequentially imaging one region with a plurality of mutually different gains to acquire a plurality of pieces of image data, and synthesizing the acquired image data to generate synthesized image data corresponding to the region. Hereinafter, this method is referred to as a wide dynamic range.

According to the wide dynamic range, even when the region includes the high-reflection region and the low-reflection region, image data acquired with an appropriate gain corresponding to the high-reflection region and image data acquired with an appropriate gain corresponding to the low-reflection region can be synthesized, and it is thereby possible to accurately observe the state of the surface of the observation object S in the region.

In the magnification observation device 300 according to the first and second embodiment, when the function of the wide dynamic range is applied to the magnification observation process, the CPU 220 may accept an adjustment instruction for the number of imaging per unit region to be imaged and the gain of the color CCD 11 at the time of imaging, as the adjustment instruction for the imaging condition for the unit region.

In this case, based on the adjustment instruction, the CPU 220 sets the number of imaging per unit region to be imaged and the gain of the color CCD 11 at the time of imaging. This enables accurate observation of the surface of the observation object S regardless of the state of the surface of the observation object S.

(2-4) In the confocal microscope, laser light emitted from a laser light source is collected to the observation object S by the object lens. Reflected light from the observation object S is collected by the photoreceptor lens, and incident on a receiving element through a pin hole. While a relative distance between the observation object S and the object lens is changed, laser light is two-dimensionally scanned on the surface of the observation object S, to thereby generate a plurality of pieces of confocal image data corresponding to a plurality of relative distances between the observation object S and the object lens. Based on the generated plurality of pieces of confocal image data, ultra-depth image data or height image data is generated. Based on the ultra-depth image data or the height image data, an ultra-depth image or a height image is displayed in the display part.

As described above, in the magnification observation device provided with the confocal microscope, a position in the height direction of the object lens with respect to the observation object S is changed at the time of imaging each unit region. For example, when the confocal microscope is provided instead of the microscope 100 of FIG. 1, the CPU 220 may accept an adjustment instruction for a movement range (upper limit position and lower limit position) in the height direction of the object lens with respect to the observation object S as the adjustment instruction for the imaging condition for the unit region.

In this case, the CPU 220 sets the movement range in the height direction of the object lens based on the adjustment instruction. This allows appropriate setting of the movement range in the height direction of the object lens.

In the above description, in the magnification observation device provided with the confocal microscope, there has been described the example of accepting the adjustment instruction for the movement range (upper limit position and lower limit position) in the height direction of the object lens with respect to the observation object S. This is not restrictive, and also in the magnification observation device 300 provided with the microscope 100 for observing the surface of the observation object S by use of white light, the CPU 220 may accept an adjustment instruction for the movement range (upper limit position and lower limit position) in the height direction of the object lens 13 with respect to the observation object S as the adjustment instruction for the imaging condition for the unit region.

(3) In the first and second embodiments, there has been described the example of moving the stage 21 in the x-direction and the y-direction, to connect the acquired image data of the plurality of unit regions. This is not restrictive, and in the magnification observation device provided with the confocal microscope, a plurality of pieces of confocal image data may be generated with respect to a plurality of unit regions, and based on the generated plurality of pieces of confocal image data, ultra-depth image data or height image data may be generated, and the generated plurality of pieces of ultra-depth image data or height image data may be connected, to thereby display in the display part the mutually connected ultra-depth images or height images of the plurality of unit regions.

It should be noted that, even in the magnification observation device 300 provided with the microscope 100 for observing the surface of the observation object S by use of white light, for example, image data of each unit region is acquired while the relative distance between the observation object S and the object lens 13 is changed, thereby allowing generation of ultra-depth image data or height image data which is indicative of the position of the surface of the observation object S in the Z-direction. Therefore, also in the magnification observation device 300 as thus described, the ultra-depth image data or the height image data of the plurality of unit regions may be connected, to display mutually connected ultra-depth images or height images of the plurality of unit regions in the display part 260.

(4) In the second embodiment, the automatic setting of the Z position of the object lens 13 has been described as the automatic setting of the imaging condition which is performed at the start of imaging each unit region. This is not restrictive, and at the start of imaging each unit region, the CPU 220 may automatically set, as the automatic setting of the imaging condition, the gain of the color CCD 11 of FIG. 1, the exposure time, the white balance, the number of imaging per unit region and the gain of the color CCD 11 at the time of each imaging, the movement range in the height direction of the object lens with respect to the observation object S, and the like.

When an appropriate gain is not detected at the time of automatically setting the gain of the color CCD 11, the CPU 220 may store the above abnormal information into the storage unit 240 of FIG. 1. Further, when an appropriate shutter speed is not detected at the time of automatically setting the exposure time, the CPU 220 may store the above abnormal information into the storage unit 240 of FIG. 1. Moreover, when an appropriate correction amount of an image data value cannot be decided at the time of automatically setting the white balance, the CPU 220 may store the above abnormal information into the storage unit 240 of FIG. 1.

Furthermore, when an appropriate number of imaging is not detected at the time of automatically setting the number of imaging per unit region, the CPU 220 may store the above abnormal information into the storage unit 240 of FIG. 1. Moreover, when an appropriate movement range (upper limit position and lower limit position) is not detected at the time of automatically setting the movement range in the height direction of the object lens with respect to the observation object S, the CPU 220 may store the above abnormal information into the storage unit 240 of FIG. 1.

Thereby, the user can view the low-magnification image (region presentation image) including the highlight, to recognize with ease whether or not each unit region has been imaged with a variety of imaging conditions in an appropriately set state.

(5) In the second embodiment, the imaging condition is automatically set at the start of imaging each unit region, and a unit region having not been normally set with the imaging condition is highlighted in the region presentation image.

This is not restrictive, and the CPU 220 may image a plurality of unit regions on a previously set imaging condition at the start of the magnification observation process, to thereby acquire image data corresponding to each unit region, and may determine whether or not the image of each unit region displayed in the display part 260 satisfies the previously set condition based on the acquired plurality of pieces of image data.

For example, when a total amount of brightness (brightness values) of a plurality of pixels in an image in each unit region has been set to be within a fixed range as the previously set condition, the CPU 220 may determine whether or not a total amount of brightness (brightness values) of a plurality of pixels in the image of each unit region is within the fixed range, and may highlight in the region presentation image the unit region of the image with the total of brightness of the plurality of pixels exceeding the fixed range.

Further, when a contrast ratio in the image of each unit region has been set within a fixed range as the previously set condition, the CPU 220 may determine whether or not the contrast ratio in the image of each unit region is within the fixed range, and may highlight in the region presentation image the unit region of the image with the contrast ratio exceeding the fixed range.

In these cases, the user can view the region presentation image, to thereby recognize with ease whether the image of each unit region satisfies the previously set condition. Therefore, the user can select any unit region shown in the region presentation image based on the highlight, to thereby re-image with ease the unit region in which an image satisfying the previously set condition has not been obtained.

(6) In the first embodiment, the imaging condition may be automatically set at the start of imaging each unit region. In this case, similarly to the second embodiment, an indicator (highlighted image, letter, symbol, frame, or the like) indicative of the unit region having not been imaged on an appropriate imaging condition may be displayed in the region presentation image.

(7) In the first and second embodiment, the object lens 13 is moved in the Z-direction, to thereby change a relative position in the Z-direction of the observation object S with respect to the objective lens 3, but this is not restrictive. The stage 21 may be moved in the Z-direction, to thereby change the relative position in the Z-direction of the observation object S with respect to the object lens 13.

[4] Corresponding Relations between Each Constitutional Element of Claims and Each Part of Embodiments Although an example of correspondence between each constitutional element of the claims and each part of the embodiments will be hereinafter described, the present invention is not limited to the following example.

In the above embodiment, the observation object S is an example of the object, the magnification observation device 300 is an example of the magnification observation device, the imaging unit 10 is an example of the imaging part, the storage unit 240 is an example of the storage part, the CPU 220 is an example of the positional information generating part, the connecting part, the control part, the determination part, and the processing apparatus, the display part 260 is an example of the display part, and the CPU 220 and the input unit 250 are examples of the accepting part.

As each constitutional element of the claims, a variety of other elements having the configuration or the function described in the claims can be employed.

The present invention is effectively applicable to magnification observation devices using a variety of microscopes.

What is claimed is:

1. A magnification observation device which images an object to display an image of the object, the device comprising:
    an imaging portion configured to respectively image a plurality of unit regions of an object to generate a plurality of pieces of image data respectively corresponding to the plurality of unit regions;
    a display portion configured to display an image based on the plurality of pieces of image data;
    an accepting portion configured to accept an selection instruction representing an area on the image displayed by the display portion to re-image a unit region of an object to regenerate a piece of image data corresponding to the unit region;
    a positional information generating portion configured to generate a positional information representing a respective positions of the plurality of unit regions; and
    a memory configured to store the plurality of pieces of image data generated by the imaging portion associated with the positional information generated by the positional information generating portion,
    a control portion configured to control the imaging portion to perform a re-imaging which is to re-image a unit region of an object corresponding to the selection instruction and the position information stored in the memory to generate a piece of image data corresponding to the unit region, and to control the display portion to display an image based on the plurality of pieces of image data partially replaced with the piece of image data generated by the re-imaging.

2. The magnification observation device according to claim 1, further comprising
    a memory configured to store the plurality of pieces of image data generated by the imaging portion,
    a connecting portion configured to connect the plurality of pieces of image data stored in the memory to generate connected image data, and
    wherein the display portion displays a connected image based on the connected image data as the image based on the plurality of pieces of image data.

3. The magnification observation device according to claim 1, wherein, when the selection instruction is accepted by the accepting part, the control part replaces the image data corresponding to the selected unit region among the image data corresponding to the plurality of unit regions stored in the storage part with the image data generated by the re-imaging.

4. The magnification observation device according to claim 1, wherein
    the accepting portion configured to further accept an adjustment instruction for adjusting an imaging condition of the imaging portion, and
    when the selection instruction is accepted by the accepting portion, the control portion controls the imaging portion so as to perform the re-imaging on the imaging condition adjusted in accordance with the adjustment instruction to generate a piece of image data corresponding to the unit region.

5. The magnification observation device according to claim 1, further comprising
a connecting portion configured to sequentially connect the generated image data to previously generated image data corresponding to another unit region, and
wherein the display portion sequentially displays a connected image based on the sequentially connected image data as the image based on the plurality of pieces of image data.

6. The magnification observation device according to claim 5,
wherein, when the selection instruction is accepted by the accepting portion, the control part controls the connected portion so as to suspend the connection of the image data.

7. The magnification observation device according to claim 1, wherein
the imaging portion images the object at a first magnification and a second magnification lower than the first magnification, and respectively images the plurality of unit regions at the first magnification to generate a plurality of pieces of image data corresponding to the plurality of unit regions, and
the display portion displays images based on image data generated by imaging at the second magnification by the imaging portion as the image based on the plurality of pieces of image data.

8. The magnification observation device according to claim 1, further comprising
a determination portion configured to determine whether or not the image of each unit region satisfies the preset condition based on the image data corresponding to each unit region, wherein
the control portion controls the display portion so as to display an indicator on the image based on the plurality of pieces of image data, the indicator for identifying an image of unit region having been determined by the determination portion not to satisfy the preset condition.

9. A magnification observation method for imaging an object to display an image of the object, the method comprising the steps of:
respectively imaging a plurality of unit regions of an object to generate a plurality of pieces of image data respectively corresponding to the plurality of unit regions;
generating positional information representing respective positions of the plurality of unit regions,
storing in memory the plurality of pieces of image data generated by the imaging associated with the positional information,
displaying an image based on the plurality of pieces of image data;
accepting an selection instruction representing an area on the image in a displayed state to re-image a unit region of an object to regenerate a piece of image data corresponding to the unit region;
re-imaging a unit region of an object corresponding to the selection instruction and the positional information to generate a piece of image data corresponding to the unit region; and
displaying an image based on the plurality of pieces of image data partially replaced with the piece of image data generated in the re-imaging state.

10. A magnification observation program that is present on a non-transitory computer-readable memory causing a processing apparatus to execute a process of imaging an object to display an image of the object, the program comprising the processes of:
respectively imaging a plurality of unit regions of an object to generate a plurality of pieces of image data respectively corresponding to the plurality of unit regions;
generating positional information representing respective positions of the plurality of unit regions,
storing in memory the plurality of pieces of image data generated by the imaging associated with the positional information,
displaying an image based on the plurality of pieces of image data;
accepting an selection instruction representing an area on the image in a displayed state to re-image a unit region of an object to regenerate a piece of image data corresponding to the unit region;
re-imaging a unit region of an object corresponding to the selection instruction and the positional information to generate a piece of image data corresponding to the unit region; and
displaying an image based on the plurality of pieces of image data partially replaced with the piece of image data generated in the re-imaging state.

* * * * *